US012180748B2

(12) United States Patent
Wang et al.

(10) Patent No.: US 12,180,748 B2
(45) Date of Patent: Dec. 31, 2024

(54) ELECTRONIC DOOR LOCK AND TRANSMISSION MECHANISM THEREOF

(71) Applicant: Primax Electronics Ltd., Taipei (TW)

(72) Inventors: Li-Chun Wang, Taipei (TW); Meng-Chieh Liu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 215 days.

(21) Appl. No.: 18/109,173

(22) Filed: Feb. 13, 2023

(65) Prior Publication Data

US 2024/0183196 A1 Jun. 6, 2024

(30) Foreign Application Priority Data

Dec. 2, 2022 (TW) .................................. 111146447

(51) Int. Cl.
*E05B 47/00* (2006.01)

(52) U.S. Cl.
CPC .. *E05B 47/0012* (2013.01); *E05B 2047/0017* (2013.01); *E05B 2047/002* (2013.01); *E05B 2047/0026* (2013.01); *E05B 2047/0036* (2013.01); *E05B 2047/0069* (2013.01)

(58) Field of Classification Search
CPC ............... E05B 47/0012; E05B 47/026; E05B 2047/0017; E05B 2047/002; E05B 2047/0026; E05B 2047/0036; E05B 2047/0069; E05B 2047/0058; E05B 2047/0067; E05B 2047/0091; E05B 2047/0031
USPC ............................................................ 70/280
See application file for complete search history.

(56) References Cited

U.S. PATENT DOCUMENTS

| | | | | |
|---|---|---|---|---|
| 5,857,365 A * | 1/1999 | Armstrong | E05B 47/0012 70/279.1 |
| 6,012,310 A * | 1/2000 | Hsiao | E05B 47/026 70/279.1 |
| 6,471,257 B1 * | 10/2002 | Lu | E05B 47/0012 292/144 |
| 6,517,127 B1 * | 2/2003 | Lu | E05B 47/0012 292/144 |
| 6,832,500 B1 * | 12/2004 | Chen | E05B 47/0012 292/144 |
| 7,770,423 B2 * | 8/2010 | Wu | E05B 47/0012 70/279.1 |
| 7,827,837 B2 * | 11/2010 | Huang | E05B 47/068 70/279.1 |

(Continued)

FOREIGN PATENT DOCUMENTS

| | | | |
|---|---|---|---|
| CA | 2710381 A1 * | 1/2012 | E05B 47/0012 |
| CA | 3009215 C * | 4/2020 | E05B 47/0012 |

(Continued)

*Primary Examiner* — Christine M Mills
*Assistant Examiner* — Steven A Tullia
(74) *Attorney, Agent, or Firm* — KIRTON McCONKIE; Evan R. Witt

(57) ABSTRACT

A transmission mechanism for an electronic door lock is provided. The transmission mechanism includes a gear box, a motor module, a transmission gear set, a transmission rod, a clutch transmission module and a motion detection circuit board. A returning detection module is installed on the motion detection circuit board. The returning detection module is used to detect the actuation state of the clutch transmission module.

32 Claims, 17 Drawing Sheets

(56) References Cited

U.S. PATENT DOCUMENTS

| | | | | |
|---|---|---|---|---|
| 8,291,733 | B2 * | 10/2012 | Chiou | E05B 55/005<br>70/279.1 |
| 8,365,561 | B2 * | 2/2013 | Chang | E05B 47/02<br>70/279.1 |
| 8,375,567 | B2 * | 2/2013 | Huang | E05B 17/22<br>29/622 |
| 8,490,445 | B2 * | 7/2013 | Chiou | E05B 47/0012<br>70/279.1 |
| 9,051,762 | B2 * | 6/2015 | Huang | E05B 49/00 |
| 9,464,458 | B2 * | 10/2016 | Huang | E05B 1/003 |
| 9,500,005 | B2 * | 11/2016 | Chen | E05B 47/0012 |
| 9,512,645 | B2 * | 12/2016 | Lowder | E05B 47/0038 |
| 9,518,406 | B1 * | 12/2016 | Buerger | E05B 17/22 |
| 9,982,462 | B2 * | 5/2018 | Lin | H02K 7/116 |
| 10,260,256 | B2 * | 4/2019 | Huang | E05B 63/04 |
| 10,612,272 | B2 * | 4/2020 | Wu | E05B 47/026 |
| 10,669,745 | B2 * | 6/2020 | Liddell | E05B 47/0012 |
| 11,443,572 | B2 * | 9/2022 | Kusanale | G07C 9/00722 |
| 11,788,322 | B2 * | 10/2023 | Chan | E05B 47/02<br>70/277 |
| 11,959,308 | B2 * | 4/2024 | Petty | G01D 5/145 |
| 2003/0209042 | A1 * | 11/2003 | Yeh | E05B 47/0012<br>70/280 |
| 2003/0209043 | A1 * | 11/2003 | Yeh | E05B 47/0012<br>70/280 |
| 2009/0173114 | A1 * | 7/2009 | Lin | E05B 47/0012<br>70/91 |
| 2009/0173120 | A1 * | 7/2009 | Lin | E05B 17/0058<br>70/279.1 |
| 2009/0211320 | A1 * | 8/2009 | Wu | E05B 47/0012<br>70/277 |
| 2015/0211260 | A1 * | 7/2015 | Chen | E05B 47/026<br>74/625 |
| 2015/0308157 | A1 * | 10/2015 | Lin | E05B 47/026<br>292/144 |
| 2018/0320413 | A1 * | 11/2018 | Wong | E05B 47/02 |
| 2020/0181946 | A1 * | 6/2020 | Laurans | E05B 47/0012 |
| 2023/0098834 | A1 * | 3/2023 | Cheng | E05B 47/0012<br>70/277 |
| 2023/0122401 | A1 * | 4/2023 | Ainley | E05B 47/0012<br>70/275 |
| 2023/0125130 | A1 * | 4/2023 | Chong | E05B 15/101<br>70/278.7 |
| 2023/0228124 | A1 * | 7/2023 | Nayak | E05B 63/04<br>70/280 |

FOREIGN PATENT DOCUMENTS

| | | | | | |
|---|---|---|---|---|---|
| CN | 112761421 | A | * | 5/2021 | E05B 15/00 |
| CN | 115874868 | A | * | 3/2023 | |
| DE | 202004020588 | U1 | * | 9/2005 | E05B 19/00 |
| TW | I582298 | B | * | 5/2017 | E05B 47/08 |

* cited by examiner

ELECTRONIC DOOR LOCK AND TRANSMISSION MECHANISM THEREOF

FIELD OF THE INVENTION

The present invention relates to a transmission mechanism, and more particularly to a transmission mechanism of an electronic door lock.

BACKGROUND OF THE INVENTION

With the advancement of modern science and technology, smart home appliances are gradually and widely used in home life. The uses of the smart home appliances make home life more comfortable and convenient. Among many types of smart home appliances, an electronic door lock is usually one of the standard equipment. Generally, the electronically controlled locking state of the electronic door lock can be released through the password of the user's input, the fingerprint recognition, the facial feature recognition, and so on. In addition, a built-in driving motor module of the electronic door lock is enabled to automatically perform the process of locking or unlocking the latch bolt.

Conventionally, in order to allow the transmission component in the electronic door lock to be correctly driven and actuated by the motor module, a sensor is usually installed in the housing of the electronic door lock to sense the actuation state of the transmission component. However, during the actuation of the transmission components inside the electronic door lock, various internal and external factors may affect the actuation speed and the start position of the transmission component. Moreover, due to the long-term accumulated actuation tolerance, the sensor is possibly unable to correctly sense the actuation state of the transmission component. If the actuation state of the transmission component is not sensed correctly, the electronic door lock cannot be operated correctly.

In order to overcome the drawbacks of the conventional technologies, it is important to provide an improved electronic door lock while avoiding the actuation error of the transmission component.

SUMMARY OF THE INVENTION

The present invention provides an electronic door lock and a transmission mechanism. In addition, the transmission mechanism has the function of performing a returning process.

In accordance with an aspect of the present invention, an electronic door lock is provided. The electronic door lock is installed on a door panel. The electronic door lock includes a first lock body, a transmission mechanism and a latch assembly. The first lock body includes a pedestal member and a covering member. The transmission mechanism is installed on the first lock body. The transmission mechanism includes a gear box, a motor module, a transmission gear set, a transmission rod, a clutch transmission module and a motion detection circuit board. The gear box includes a lower cover and an upper cover, which are combined with each other. The lower cover includes a first opening and at least one detection hole. The upper cover includes a second opening corresponding to the first opening. The motor module is installed on the lower cover. The transmission gear set is pivotally coupled with the lower cover and engaged with the motor module. A first end and a second end of the transmission rod are respectively penetrated through the first opening and the second opening. The clutch transmission module including a clutch gear, a connection element and two stopping elements. The clutch gear has a first surface and a second surface opposite to the first surface. A concave structure is formed in the first surface. Two push blocks are disposed within the concave structure, arranged along a same rotation path and opposed to each other. A first pivotal hole runs through a middle region of the concave structure. Two sensing points are formed on the second surface, arranged along a same rotation path and opposed to each other. The transmission rod is penetrated through the first axial hole. Consequently, the clutch gear is pivotally coupled with the transmission rod and engaged with the transmission gear set. The connection element is rotatably embedded within the concave structure. The connection element and the transmission rod are connected with each other. Consequently, the connection element is linked with the transmission rod. The two stopping elements are installed on two opposite sides of the connection element, and the two stopping elements include two stopping parts corresponding to the two push blocks, respectively. The motion detection circuit board is electrically connected with the motor module and installed on a lateral side of the lower cover away from the upper cover. The motion detection circuit board has a third surface and a fourth surface opposite to the third surface. A returning detection module is installed on the third surface. The returning detection module is installed in the at least one detection hole. The returning detection module includes a first returning detection unit and a second returning detection unit. The first returning detection unit and the second returning detection unit are aligned with a rotation path of the two sensing points. The latch assembly includes a latch mandrel, a latch bolt and a torque blade. The latch bolt is received within the latch mandrel. The torque blade is penetrated through the latch mandrel. The torque blade is connected with the first end of the transmission rod. The latch bolt is selectively protruded out or retracted back through the torque blade. While the motor module drives a rotation of the clutch gear through the transmission gear set, the two push blocks are rotated to push the stopping parts of the corresponding stopping elements, and the transmission rod is correspondingly rotated. While the transmission rod is rotated, the torque blade is correspondingly rotated, and the latch bolt is correspondingly protruded out of the latch mandrel. After the latch bolt is protruded to a locking position, the motor module drives a reverse rotation of the clutch gear, and the two push blocks are detached from the corresponding stopping elements. When the motion detection circuit board detects that one of the two sensing points is transferred across at least one of the first returning detection unit and the second returning detection unit, the reverse rotation of the clutch gear is stopped, and a returning process is completed.

In an embodiment, the first end of the transmission rod includes a transmission body, and two protruded edges are formed on two opposite sides of the transmission body along a radial direction of the transmission rod.

In an embodiment, the electronic door lock further includes a locking detection module. The locking detection module is installed on the fourth surface of the motion detection circuit board. The locking detection module includes a first locking detection unit and a second locking detection unit corresponding to the two protruded edges.

In an embodiment, when the latch bolt is completely received within the latch mandrel, the second locking detection unit is pressed by a first protruded edge of the two protruded edges.

In an embodiment, while the latch bolt is protruded to the locking position, the first protruded edge is detached from the second locking detection unit, and a second protruded edge of the two protruded edges is correspondingly moved and then contacted with the first locking detection unit.

In an embodiment, while the latch bolt is protruded to the locking position, the first protruded edge is detached from the second locking detection unit and then contacted with the first locking detection unit.

In an embodiment, the locking detection module is a micro switch module.

In an embodiment, the returning detection module is a light detection module, and the two sensing points are light reflection points.

In an embodiment, the returning detection module is a Hall magnetic sensor module, and the two sensing points are magnetic elements.

In an embodiment, a polygonal coupling recess is formed in a surface of the connection element facing the clutch gear.

In an embodiment, the transmission rod further includes a polygonal coupling block corresponding to the polygonal coupling recess. The polygonal coupling block is protruded along a radial direction of the transmission rod. The polygonal coupling block and the polygonal coupling recess are coupled with each other. Consequently, the connection element is linked with the transmission rod.

In an embodiment, the connection element includes a second axial hole, and the second axial hole is coaxial with the polygonal coupling recess.

In an embodiment, the electronic door lock further includes an operation element, and the covering member includes a mounting hole. The operation element is installed in the mounting hole.

In an embodiment, the second end of the transmission rod is connected with the operation element through the mounting hole.

In an embodiment, the second end of the transmission rod includes a fixing segment, and the operation element includes a knob structure and a shaft part. The shaft part is connected with the knob structure. The shaft part is installed in the mounting hole. The shaft part is connected with the fixing segment.

In an embodiment, the motor module includes a motor body and a worm screw. The worm screw is connected with the motor body.

In an embodiment, the transmission gear set includes a first composite gear and a second composite gear. The first composite gear includes a first large-diameter tooth part and a first small-diameter tooth part. The first large-diameter tooth part and the first small-diameter tooth part are coaxial with each other. The second composite gear includes a second large-diameter tooth part and a second small-diameter tooth part. The second large-diameter tooth part and the second small-diameter tooth part are coaxial with each other.

In an embodiment, the first small-diameter tooth part of the first composite gear and the clutch gear are engaged with each other, the first large-diameter tooth part of the first composite gear and the second small-diameter tooth part of the second composite gear are engaged with each other, and the second large-diameter tooth part of the second composite gear and the worm screw of the motor module are engaged with each other.

In an embodiment, each of the two stopping elements is made of a material with rigidity and elasticity.

In accordance with an aspect of the present invention, a transmission mechanism for an electronic door lock is provided. The transmission mechanism includes a gear box, a motor module, a transmission gear set, a transmission rod, a clutch transmission module and a motion detection circuit board. The gear box includes a lower cover and an upper cover, which are combined with each other. The lower cover includes a first opening and at least one detection hole. The upper cover includes a second opening corresponding to the first opening. The motor module is installed on the lower cover. The transmission gear set is pivotally coupled with the lower cover and engaged with the motor module. A first end and a second end of the transmission rod are respectively penetrated through the first opening and the second opening. The clutch transmission module including a clutch gear, a connection element and two stopping elements. The clutch gear has a first surface and a second surface opposite to the first surface. A concave structure is formed in the first surface. Two push blocks are disposed within the concave structure, arranged along a same rotation path and opposed to each other. A first pivotal hole runs through a middle region of the concave structure. Two sensing points are formed on the second surface, arranged along a same rotation path and opposed to each other. The transmission rod is penetrated through the first axial hole. Consequently, the clutch gear is pivotally coupled with the transmission rod and engaged with the transmission gear set. The connection element is rotatably embedded within the concave structure. The connection element and the transmission rod are connected with each other. Consequently, the connection element is linked with the transmission rod. The two stopping elements are installed on two opposite sides of the connection element, and the two stopping elements include two stopping parts corresponding to the two push blocks, respectively. The motion detection circuit board is electrically connected with the motor module and installed on a lateral side of the lower cover away from the upper cover. The motion detection circuit board has a third surface and a fourth surface opposite to the third surface. A returning detection module is installed on the third surface. The returning detection module is installed in the at least one detection hole. The returning detection module includes a first returning detection unit and a second returning detection unit. The first returning detection unit and the second returning detection unit are aligned with a rotation path of the two sensing points.

In an embodiment, the first end of the transmission rod includes a transmission body, and two protruded edges are formed on two opposite sides of the transmission body along a radial direction of the transmission rod.

In an embodiment, the transmission mechanism further includes a locking detection module. The locking detection module is installed on the fourth surface of the motion detection circuit board. The locking detection module includes a first locking detection unit and a second locking detection unit. The first locking detection unit and the second locking detection unit correspond to the two protruded edges. The first locking detection unit or the second locking detection unit is permitted to be pressed by one of the two protruded edges.

In an embodiment, the locking detection module is a micro switch module.

In an embodiment, the returning detection module is a light detection module, and the two sensing points are light reflection points.

In an embodiment, the returning detection module is a Hall magnetic sensor module, and the two sensing points are magnetic elements.

In an embodiment, a polygonal coupling recess is formed in a surface of the connection element facing the clutch gear.

In an embodiment, the transmission rod further includes a polygonal coupling block corresponding to the polygonal coupling recess. The polygonal coupling block is protruded along a radial direction of the transmission rod. The polygonal coupling block and the polygonal coupling recess are coupled with each other. Consequently, the connection element is linked with the transmission rod.

In an embodiment, the connection element includes a second axial hole, and the second axial hole is coaxial with the polygonal coupling recess.

In an embodiment, the motor module includes a motor body and a worm screw. The worm screw is connected with the motor body.

In an embodiment, the transmission gear set includes a first composite gear and a second composite gear. The first composite gear includes a first large-diameter tooth part and a first small-diameter tooth part. The first large-diameter tooth part and the first small-diameter tooth part are coaxial with each other. The second composite gear includes a second large-diameter tooth part and a second small-diameter tooth part. The second large-diameter tooth part and the second small-diameter tooth part are coaxial with each other.

In an embodiment, the first small-diameter tooth part of the first composite gear and the clutch gear are engaged with each other, the first large-diameter tooth part of the first composite gear and the second small-diameter tooth part of the second composite gear are engaged with each other, and the second large-diameter tooth part of the second composite gear and the worm screw of the motor module are engaged with each other.

In an embodiment, each of the two stopping elements is made of a material with rigidity and elasticity.

In accordance with another aspect of the present invention, a returning control method for an electronic door lock is provided. The returning control method includes the following steps. In a step (A), a motor module of the electronic door lock is enabled to drive a movement of the latch bolt in a moving direction, so that the latch bolt is protruded out to a locking position. The moving direction is a first direction or a second direction. In a step (B), a returning process is performed according to the moving direction. Then, a step (C) is performed to judge whether the returning process is completed. In a step (D), if the returning process is not completed, an erroneous message is reported.

From the above descriptions, the present invention provides an electronic door lock and a transmission mechanism of the electronic door lock. When compared with the conventional technologies, the transmission mechanism of the present invention can drive the movement of the latch bolt of the electronic door lock in two different directions. Consequently, the electronic door lock is suitably applied to the door panel opened/closed to the left side or the door panel opened/closed to the right side. Moreover, after the latch bolt is protruded to the locking position, the returning process is performed. Consequently, even if the clutch gear is stuck, the user can easily twist the operating element to unlock the electronic door lock.

Furthermore, the sensing elements for sensing the actuation states of the transmission components (e.g., the returning detection module and the locking detection module) and the corresponding sensing structures are integrated into the transmission mechanism. Due to this structural design, the long-term accumulated actuation tolerance of the transmission components in the electronic door lock can be effectively reduced. In other words, the sensing elements can correctly sense the actuation state of the transmission components, and the transmission components in the electronic door lock can be operated normally. Moreover, due to the integrated design of the transmission mechanism, the overall volume of the transmission mechanism will be reduced, and the transmission mechanism can be installed in different electronic door locks in a simplified manner. Consequently, the cost of designing and fabricating the electronic door lock is reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
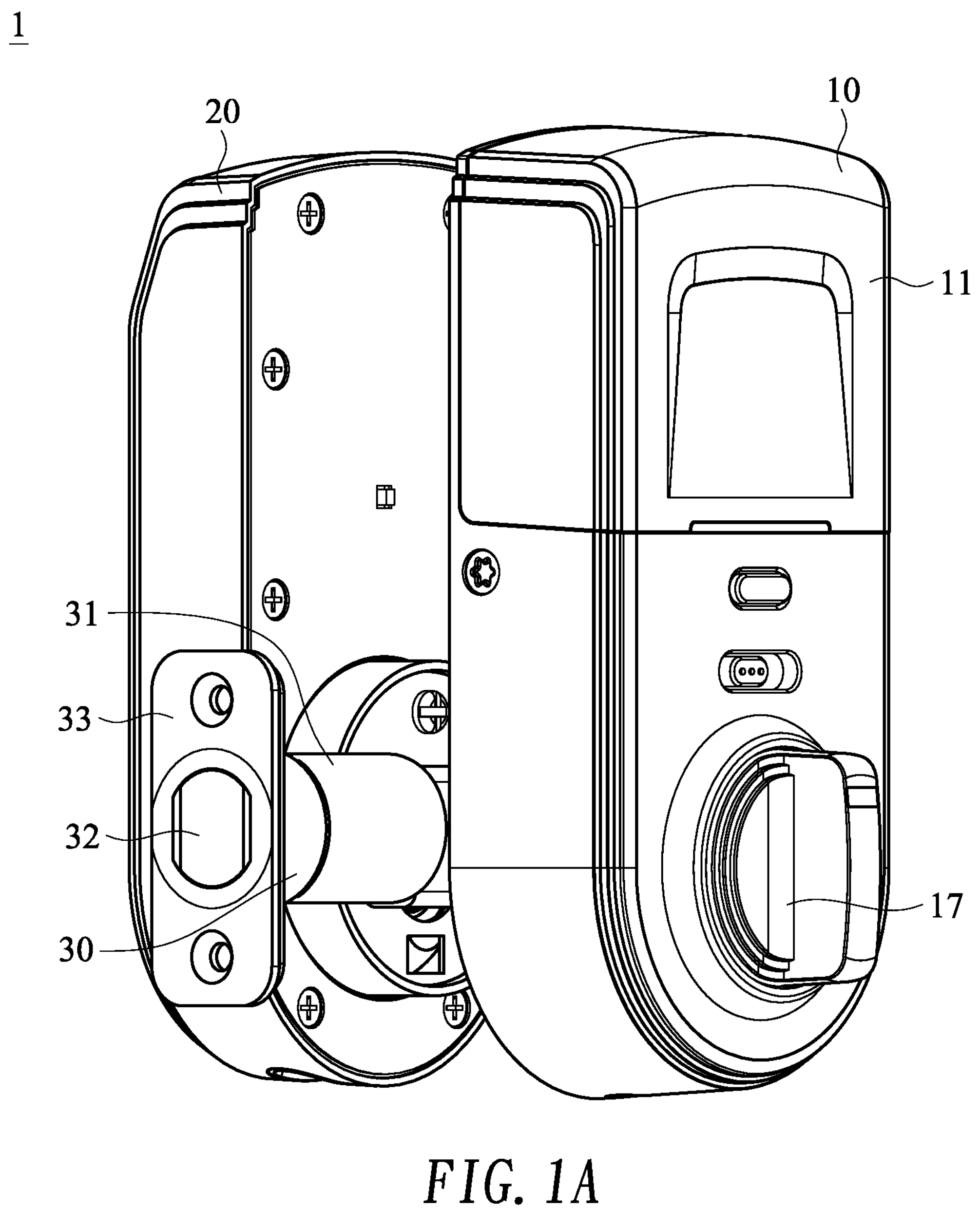
FIG. 1A is a schematic perspective view illustrating an electronic door lock according to an embodiment of the present invention and taken along a viewpoint.
Figure 1B:
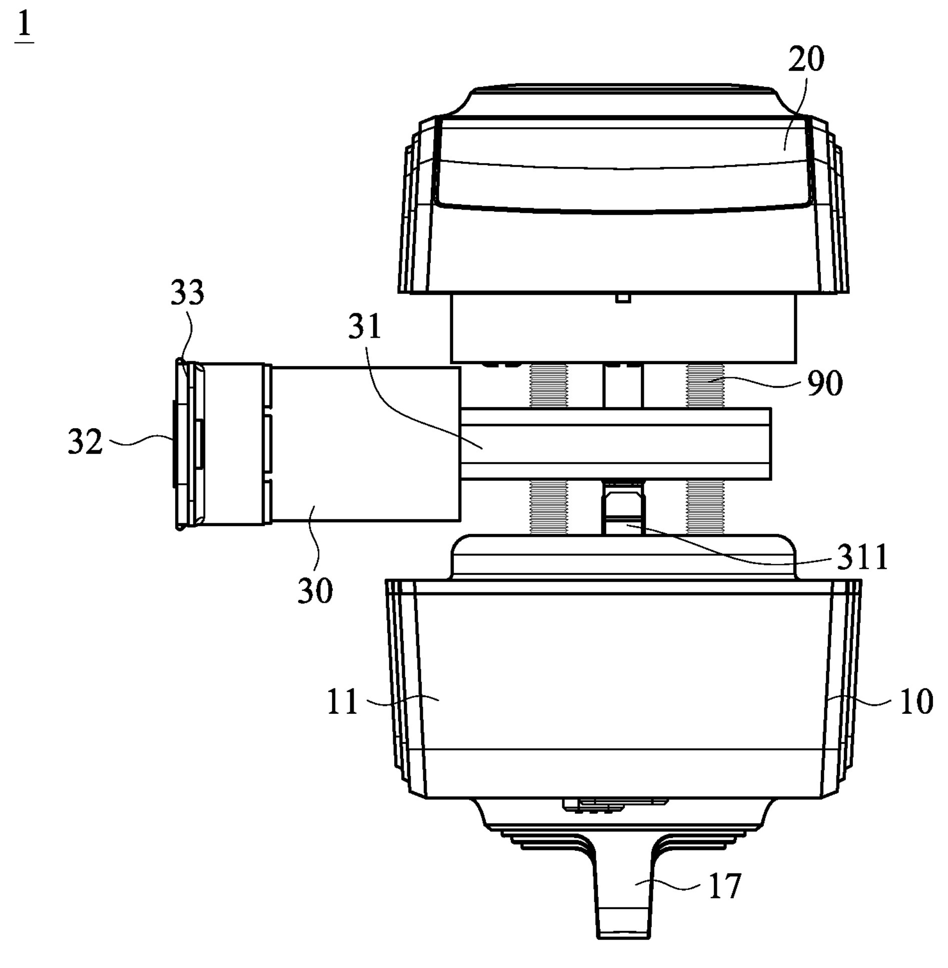
FIG. 1B is a schematic top view illustrating the electronic door lock according to the embodiment of the present invention.
Figure 1C:
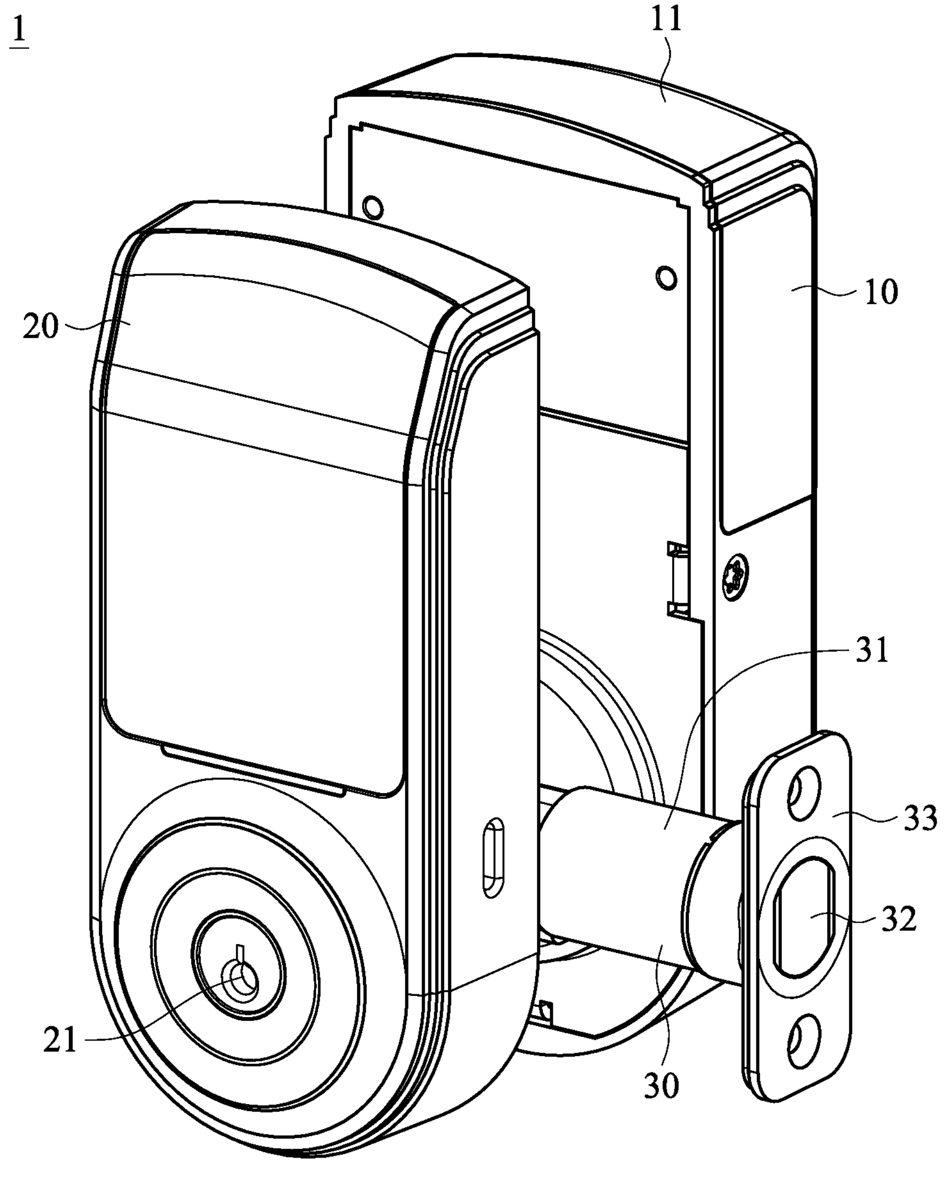
FIG. 1C a schematic perspective view illustrating an electronic door lock according to the embodiment of the present invention and taken along another viewpoint.

Please refer to FIGS. 1A, 1B and 1C. FIG. 1A is a schematic perspective view illustrating an electronic door lock according to an embodiment of the present invention and taken along a viewpoint. FIG. 1B is a schematic top view illustrating the electronic door lock according to the embodiment of the present invention. FIG. 1C a schematic perspective view illustrating an electronic door lock according to the embodiment of the present invention and taken along another viewpoint.

The electronic door lock 1 can be installed on a door panel (not shown). In an embodiment, the electronic door lock 1 comprises a first lock body 10, a second lock body 20 and a latch assembly 30. The first lock body 10 and the second lock body 20 are respectively installed on two opposite sides of the door panel. For example, the first lock body 10 and the second lock body 20 are respectively installed on an indoor side and an outdoor side of the door panel. The latch assembly 30 is installed on a lateral side of the door panel. The first lock body 10, the second lock body 20 and the latch assembly 30 are combined together through fixing bolts 90, and the combination of the first lock body 10, the second lock body 20 and the latch assembly 30 is fixed on the door panel.

An operation element 17 is installed on a housing 11 of the first lock body 10. The user can manually perform a locking action or an unlocking action on the electronic door lock 1 through the operation element 17. The second lock body 20 comprises a lock cylinder structure 21. The latch assembly 30 comprises a latch mandrel 31, a latch bolt 32 and a torque blade 311. The latch bolt 32 can be received within the latch mandrel 31. The torque blade 311 is penetrated through the latch mandrel 31.

The latch bolt 32 can be protruded out of an opening of the latch mandrel 31. In this embodiment, the latch assembly 30 further comprises a latch plate 33. The latch plate 33 is extended upwardly and downwardly from the opening of the latch mandrel 31. In addition, the latch assembly 30 can be fixed on the lateral side of the door panel through the latch plate 33. The two ends of the torque blade 311 are respectively connected with the operation element 17 and the lock cylinder structure 21. Consequently, the user can use a key (not shown) to rotate the lock cylinder structure 21, or the user can manually rotate the operation element 17 to drive the rotation of the torque blade 311. By controlling the protrusion or the retraction of the latch bolt 32, the locking action or the unlocking action can be selectively performed on the electronic door lock 1.

Figure 2:
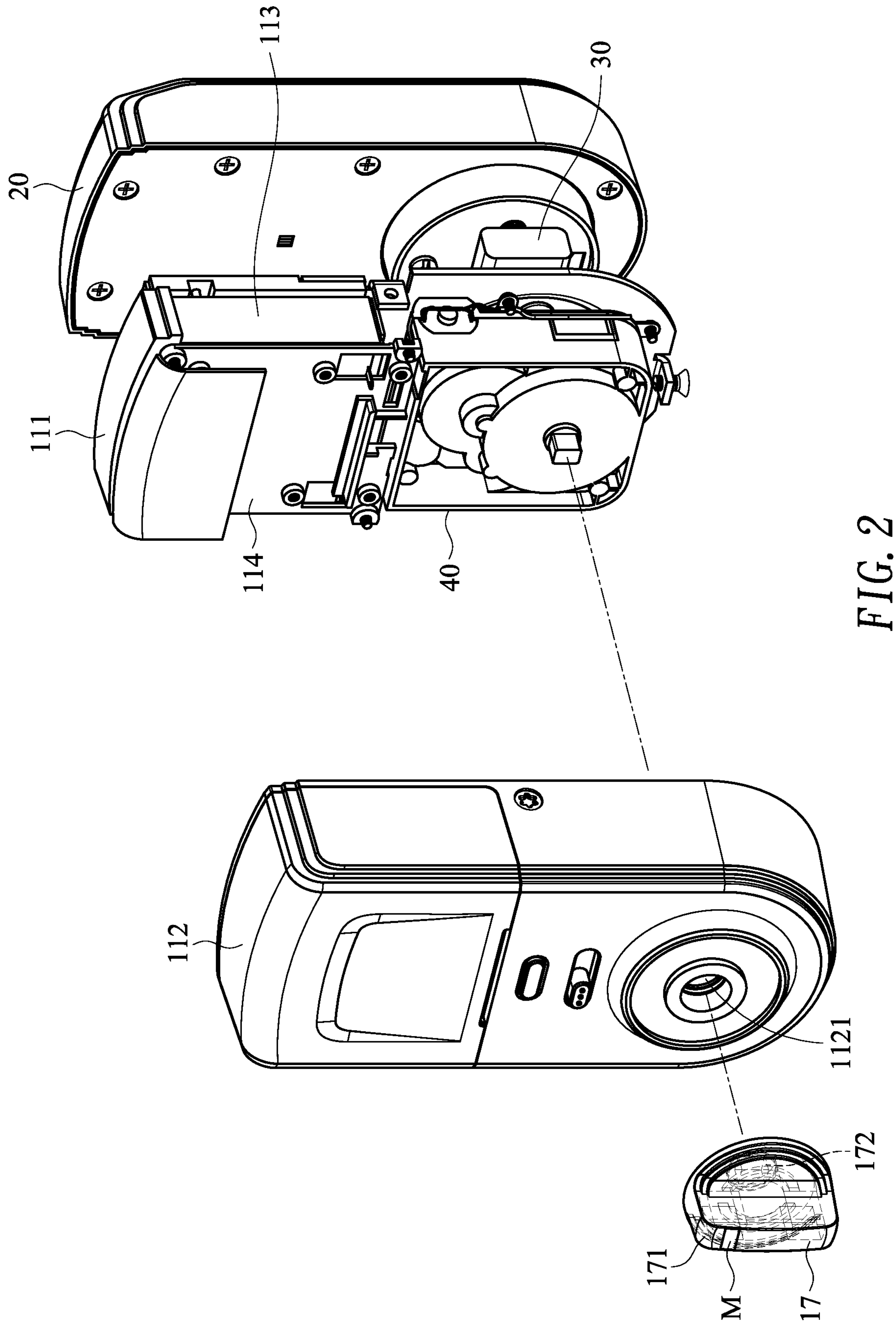
FIG. 2 is a schematic exploded view illustrating a portion of the electronic door lock according to the embodiment of the present invention.
Figure 3A:
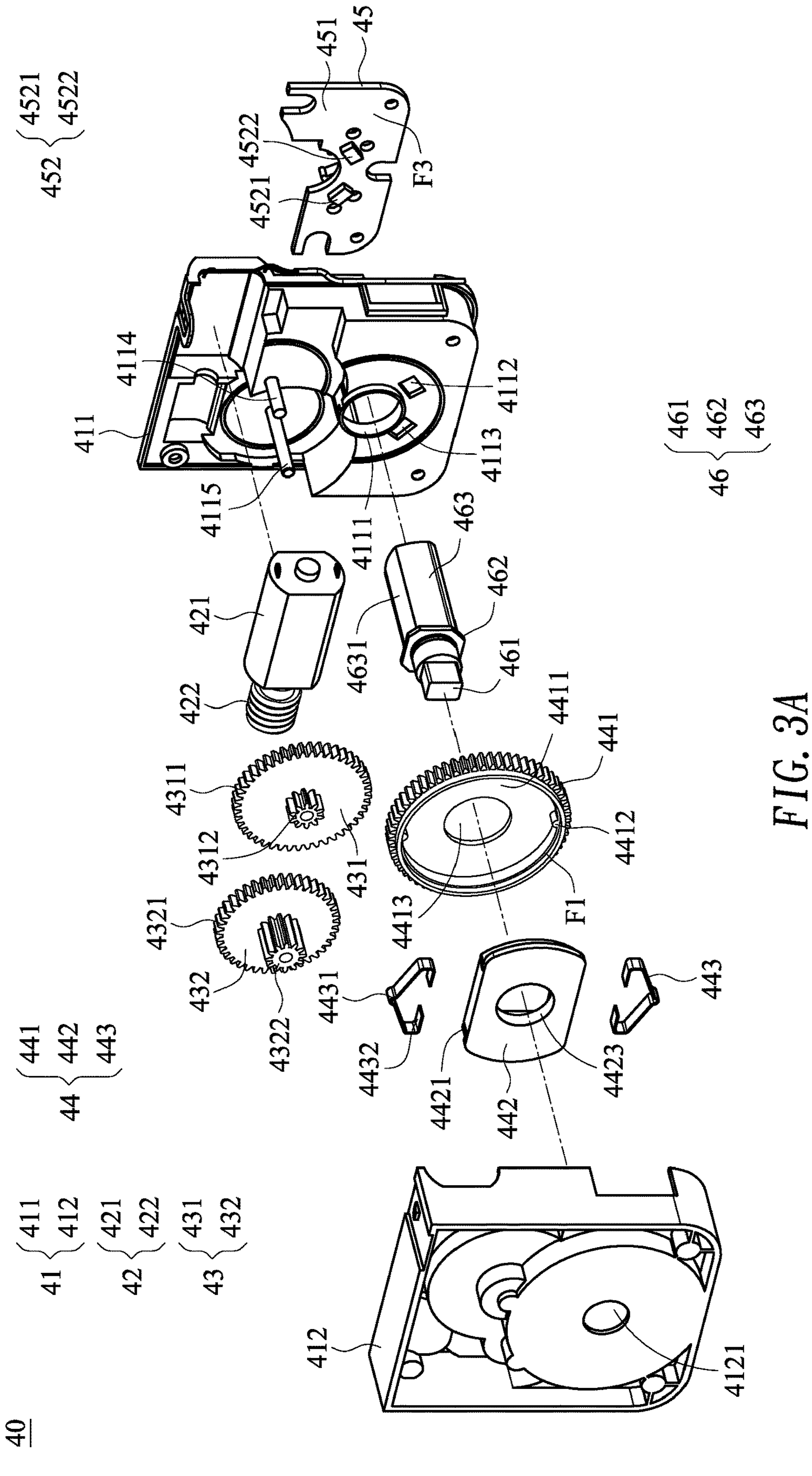
FIG. 3A is a schematic exploded view illustrating a transmission mechanism of the electronic door lock according to the embodiment of the present invention and taken along a viewpoint.
Figure 3B:
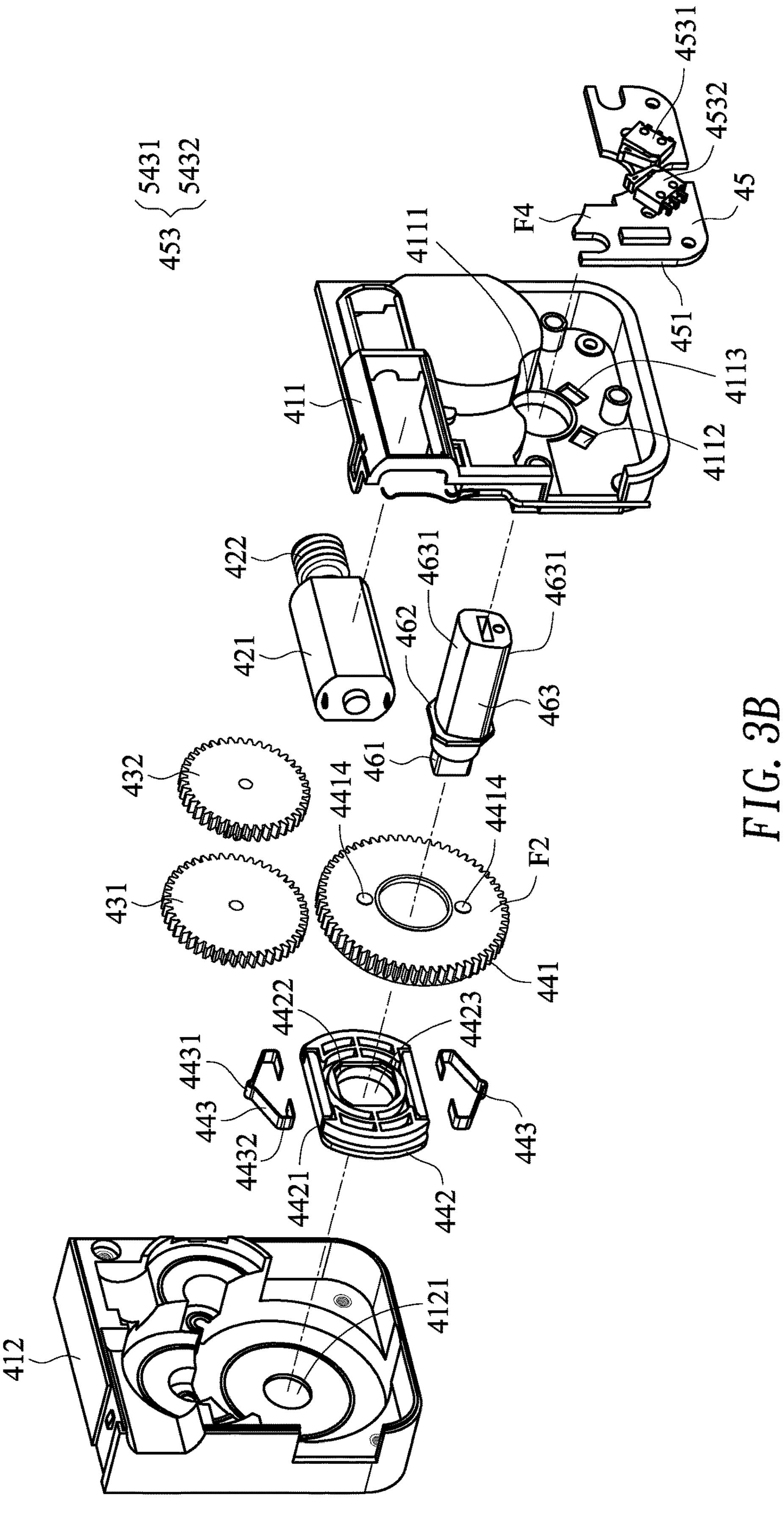
FIG. 3B is a schematic exploded view illustrating the transmission mechanism of the electronic door lock according to the embodiment of the present invention and taken along another viewpoint.

Please refer to FIGS. 2, 3A and 3B. FIG. 2 is a schematic exploded view illustrating a portion of the electronic door lock according to the embodiment of the present invention. FIG. 3A is a schematic exploded view illustrating a transmission mechanism of the electronic door lock according to the embodiment of the present invention and taken along a viewpoint. FIG. 3B is a schematic exploded view illustrating the transmission mechanism of the electronic door lock according to the embodiment of the present invention and taken along another viewpoint. The housing 11 of the first lock body 10 comprises a pedestal member 111 and a covering member 112. When the pedestal member 111 and the covering member 112 are combined together, an accommodation space is formed between the pedestal member 111 and the covering member 112. The covering member 112 comprises a mounting hole 1121. The operation element 17 is installed in the mounting hole 1121. The upper portion of the pedestal member 111 comprises a power supply module 113 and a main circuit board 114.

The power supply module 113 provides electric power for the electronic door lock 1. The main circuit board 114 is electrically connected with an operation interface of the electronic door lock 1, a display interface, a speaker (not shown) or any other appropriate output device. Furthermore, a transmission mechanism 40 is located under the power supply module 113 and the main circuit board 114.

The operation element 17 comprises a knob structure 171 and a shaft part 172. The shaft part 172 is connected with the knob structure 171. The shaft part 172 is installed in the mounting hole 1121. In addition, the shaft part 172 is coupled with the torque blade 311 (see FIG. 1B) of the latch assembly 30 through the transmission mechanism 40. Consequently, the operation element 17 is linked with the torque blade 311. In this embodiment, a rotation mark M for facilitating the user's recognition is formed on the knob structure 171. For example, if the electronic door lock 1 is unlocked, the knob structure 171 is in a vertical status, and the rotation mark M is located at the 12 o'clock position. When the knob structure 171 is rotated in a clockwise direction or a counterclockwise direction to the 3 o'clock position or the 9 o'clock position, the electronic door lock 1 is locked.

Please refer to FIGS. 3A and 3B again. The transmission mechanism 40 comprises a gear box 41, a motor module 42, a transmission gear set 43, a clutch transmission module 44, a motion detection circuit board 45 and a transmission rod 46.

The gear box 41 comprises a lower cover 411 and an upper cover 412, which are combined with each other. The lower cover 411 comprises a first opening 4111, two detection holes 4112 and 4113, and two rotation shafts 4114 and 4115. The upper cover 412 comprises a second opening 4121 corresponding to the first opening 4111. In this embodiment, the detection holes 4112 and 4113 are located beside the first opening 4111. In addition, the rotation shafts 4114 and 4115 are arranged beside each other.

The motor module 42 is installed on the lower cover 411. In an embodiment, the motor module 42 comprises a motor body 421 and a worm screw 422. The worm screw 422 is connected with the motor body 421.

In an embodiment, the transmission gear set 43 comprises a first composite gear 431 and a second composite gear 432. The first composite gear 431 and the second composite gear 432 are respectively installed on the rotation shafts 4114 and 4115. Consequently, the first composite gear 431 and the second composite gear 432 are pivotally coupled with the lower cover 411. The first composite gear 431 comprises a first large-diameter tooth part 4311 and a first small-diameter tooth part 4312, which are coaxial with each other. The second composite gear 432 comprises a second large-diameter tooth part 4321 and a second small-diameter tooth part 4322, which are coaxial with each other.

In an embodiment, the clutch transmission module 44 comprises a clutch gear 441, a connection element 442 and two stopping elements 443.

The clutch gear 441 has a first surface F1 and a second surface F2, which are opposed to each other. A concave structure 4411 is formed in the first surface F1 of the clutch gear 441. In addition, two push blocks 4412 are disposed within the concave structure 4411. The two push blocks 4412 are respectively located at two opposite sides on the inner wall of the concave structure 4411. In addition, the two push blocks are arranged along the same rotation path. A first axial hole 4413 is formed in a middle region of a bottom surface of the concave structure 441. In other words, the first axial hole 4413 runs through the middle region of the clutch gear 441. Moreover, two sensing points 4414 are formed on second surface F2 of the clutch gear 441. The two sensing points 4414 are opposed to each other. In addition, the two sensing points 4414 are arranged along the same rotation path. In this embodiment, the two push blocks are formed on the inner wall of the concave structure 4411. It is noted that numerous modifications and alterations may be made while retaining the teachings of the invention. For example, in another embodiment, the two push blocks 4412 are formed on the bottom surface of the concave structure 4411. In an embodiment, the sensing points 4414 are light reflection points made of reflective material. For example, the reflective material is white plastic material, silver paint or metallic material.

The connection element 442 is rotatably embedded within the concave structure 4411. In this embodiment, the connection element 442 comprises two lateral edges and two arc-shaped raised structures. The two lateral edges are in parallel with each other. The two arc-shaped raised structures are respectively perpendicular to the two lateral edges. The arc-shaped raised structures of the connection element 442 correspond to the inner wall of the concave structure 4411. Each of the two lateral edges comprise two locking slots 4421, respectively. A polygonal coupling recess 4422 and a second axial hole 4423 are formed in the surface of the connection element 442 facing the clutch gear 441. The second axial hole 4423 is coaxial with the polygonal coupling recess 4422. In addition, the second axial hole 4423 runs through the connection element 442.

Each stopping element 443 comprises a stopping part 4431 and two bent parts 4432. The two bent parts 4432 are extended externally from two opposite side of the stopping part 4431. The two bent parts 4432 are respectively embedded within the corresponding locking slots 4421 of the connection element 442. Consequently, the two stopping elements 443 are fixed on the opposite sides of the connection element 442. The two stopping parts 4431 of the two stopping elements 443 respectively correspond to the two push blocks 4412 within the concave structure 4411 of the clutch gear 441. Moreover, the stopping elements 443 are made of a material with rigidity and elasticity. For example, each of the two stopping elements 443 is a metal shrapnel.

The motion detection circuit board 45 is electrically connected with the motor module 42. In addition, the motion detection circuit board 45 is installed on a lateral side of the lower cover 411 away from the upper cover 412. In an embodiment, the motion detection circuit board 45 comprises a circuit board body 451, a returning detection module 452 and a locking detection module 453. The circuit board body 451 has a third surface F3 and a fourth surface F4, which are opposed to each other. The returning detection module 452 is installed on the third surface F3 of the circuit board body 451. The returning detection module 452 comprises a first returning detection unit 4521 and a second returning detection unit 4522. The locking detection module 453 is installed on the fourth surface F4 of the circuit board body 451. In an embodiment, the locking detection module 453 comprises a first locking detection unit 4531 and a second locking detection unit 4532.

In this embodiment, the third surface F3 of the circuit board body 451 faces the lower cover 411. The returning detection units 4521 and 4522 of the returning detection module 452 are respectively aligned with and inserted into the detection holes 4113 and 4112. In this embodiment, the returning detection module 452 is a light detection module, and the locking detection module 453 is a micro switch module. In this embodiment, the two detection holes 4113 and 4112 are respective aligned with the two returning detection units. It is noted that numerous modifications and alterations may be made while retaining the teachings of the invention. For example, in another embodiment, the lower cover 411 comprises a single detection hole, and the detection hole aligned with both of the two returning detection units.

The two opposite ends of the transmission rod 46 are respectively penetrated through the first opening 4111 and the second opening 4121. In addition, the transmission rod 46 is rotatably installed on the gear box 41. The transmission rod 46 comprises a fixing segment 461, a polygonal coupling block 462 and a transmission body 463. The transmission body 463 is penetrated through the first opening 4111 of the lower cover 411. The transmission body 463 is connected with the torque blade 311 of the latch assembly 30 as shown in FIG. 1B. In addition, two protruded edges 4631 are formed on two opposite sides of the transmission body 463 along the radial direction. The fixing segment 461 is penetrated through the second opening 4121 of the upper cover 412. In addition, the fixing segment 461 is connected with the shaft part 172 of the operation element 17 as shown in FIG. 2. The polygonal coupling block 462 is protruded along the radial direction. In addition, the polygonal coupling block 462 is arranged between the fixing segment 461 and the transmission body 463.

Figure 4A:
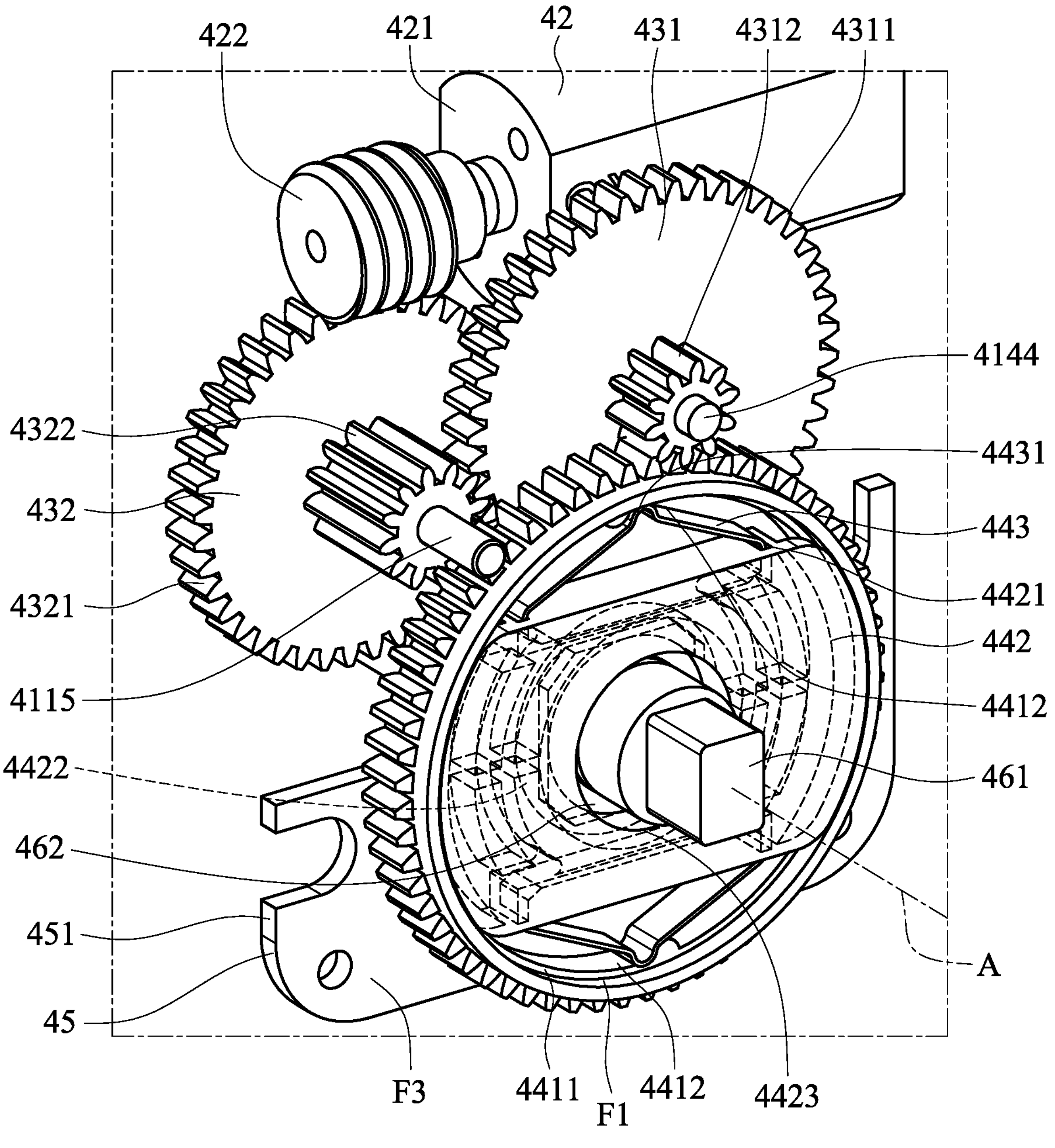
FIG. 4A is a schematic perspective view illustrating the inner portion of the transmission mechanism of the present invention and taken along a viewpoint.
Figure 4B:
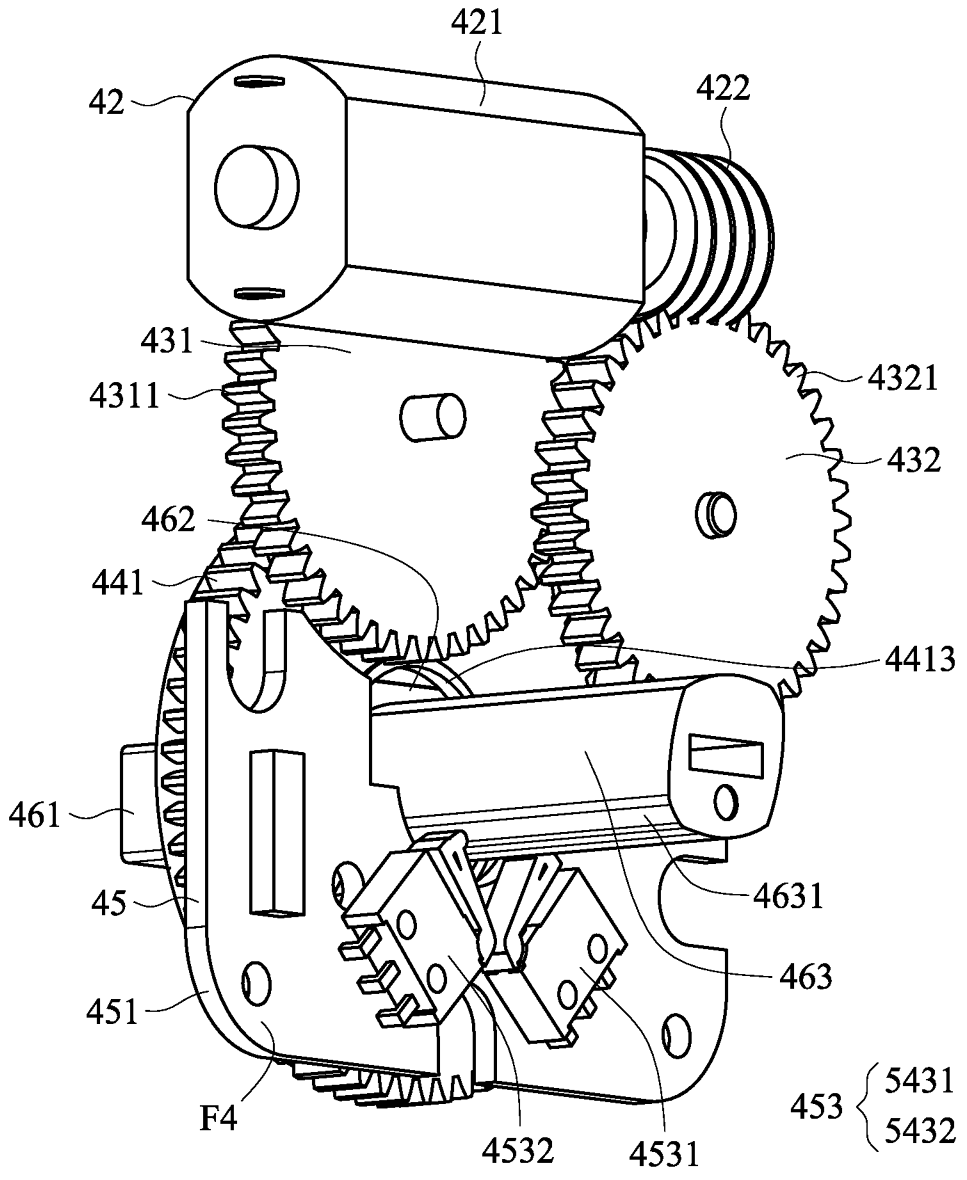
FIG. 4B is a schematic perspective view illustrating the inner portion of the transmission mechanism of the present invention and taken along another viewpoint.
Figure 4C:
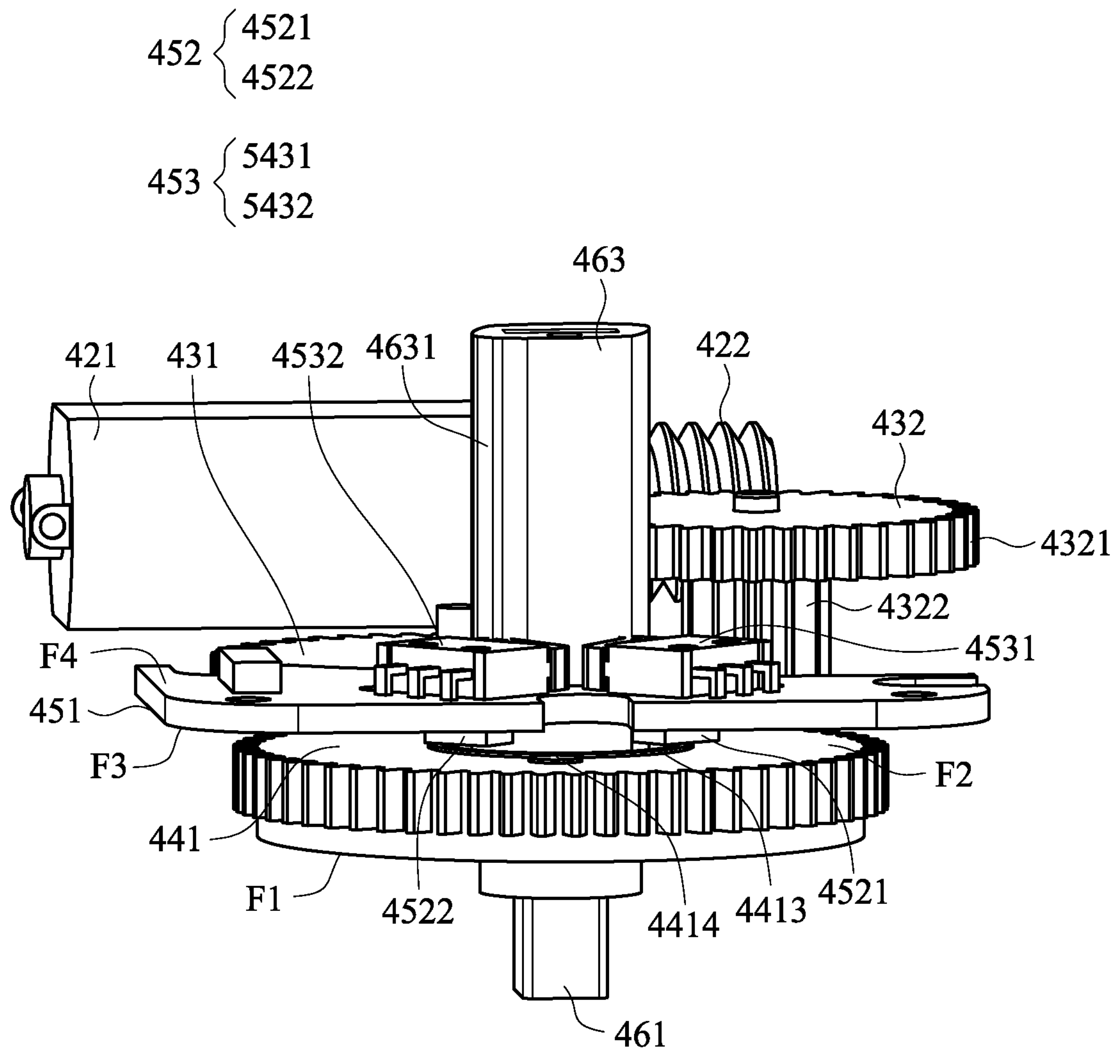
FIG. 4C is a schematic perspective and bottom view illustrating the inner portion of the transmission mechanism of the present invention.

Please refer to FIGS. 4A, 4B and 4C. FIG. 4A is a schematic perspective view illustrating the inner portion of the transmission mechanism of the present invention and taken along a viewpoint. FIG. 4B is a schematic perspective view illustrating the inner portion of the transmission mechanism of the present invention and taken along another viewpoint. FIG. 4C is a schematic perspective and bottom view illustrating the inner portion of the transmission mechanism of the present invention. For well understanding the concepts of the present invention, the upper cover 411 and the lower cover 412 of the gear box 41 are not shown.

When the transmission gear set 43 is installed on the lower cover 411, the second large-diameter tooth part 4321 of the second composite gear 432 and the worm screw 422 of the motor module 42 are engaged with each other, and the first large-diameter tooth part 4311 of the first composite gear 431 and the second small-diameter tooth part 4322 of the second composite gear 432 are engaged with each other.

The fixing segment 461 of the transmission rod 46 is sequentially penetrated through the first axial hole 4413, the polygonal coupling recess 4422 and the second axial hole 4423 of the clutch transmission module 44. In addition, the polygonal coupling block 462 of the transmission rod 46 and the polygonal coupling recess 4422 of the connection element 442 are coupled with each other. Consequently, the connection element 442 and the transmission rod 46 are linked with each other. Moreover, a rotation axis line A is defined by the transmission rod 46.

As mentioned above, the connection element 442 is embedded within the concave structure 4411 of the clutch gear 441. In addition, the clutch gear 441 is engaged with the first small-diameter tooth part 4312 of the first composite gear 431. Consequently, the motor module 42 can drive the rotation of the clutch gear 441 through the transmission gear set 43. While the clutch gear 441 is rotated in a clockwise direction or a counterclockwise direction, the two push blocks 4412 within the concave structure 4411 are rotated to push the corresponding stopping parts 431. Consequently, the connection element 442 and the transmission rod 46 linked with the connection element 442 are correspondingly rotated.

Moreover, each of the two stopping elements 443 is made of a material with rigidity and elasticity. This design is a protection mechanism. For example, if the torque of the motor module 42 for driving the clutch gear 441 is too large, the push blocks 4412 may compress the corresponding stopping parts 4431. Under this circumstance, the stopping parts 4431 are subjected to deformation, and the push blocks 4412 are moved across the corresponding stopping parts 4431. Consequently, the damage of the transmission gear set 43, the clutch gear 441 or the transmission rod 46 caused by the excessive torque will be avoided.

In some special situations, the motor module 42, the transmission gear set 43 or the clutch gear 441 is damaged or stuck and unable to be rotated. Under this circumstance, the user has to operate the operation element 17 as shown in FIG. 2 to unlock the electronic door lock 1. Even if the user twists the operation element 17 with a large force to rotate the transmission rod 46, the push blocks 4412 may compress the corresponding stopping parts 4431 upon the rotation of the transmission rod 46. Under this circumstance, the stopping parts 4431 are subjected to deformation, and the stopping parts 4431 are moved across the corresponding push blocks 4412. As a consequence, the transmission rod 46 can be rotated smoothly to unlock the latch assembly 30. This design is another protection mechanism. Due to this protection mechanism, the user will not be locked inside and outside the house in the situation that the motor module 42, the transmission gear set 43 or the clutch gear 441 is damaged or stuck.

The locking detection module 453 is located beside the transmission rod 46. The first locking detection unit 4531 and the second locking detection unit 4532 of the locking detection module 453 correspond to the two protruded edges 4631 of the transmission body 463. The locking detection module 453 is used to detect the rotation status of the transmission body 463. When the transmission rod 46 is rotated to a specific angle, the first locking detection unit 4531 or the second locking detection unit 4532 is pressed by one of the two protruded edges 4631. Consequently, the locking detection module 453 generates a corresponding feedback signal.

It is noted that the locking detection module 453 is not restricted to the micro switch module. For example, in a variant example, the locking detection module 453 is a light detection module, and the two protruded edges 4631 are replaced by light reflection points. In another variant example, the locking detection module 453 is a Hall magnetic sensor module, and the two protruded edges 4631 are replaced by magnetic elements.

The first returning detection unit 4521 and the second returning detection unit 4522 of the returning detection module 452 are aligned with the rotation path of the two sensing points 4414 of the clutch gear 441. In addition, the first returning detection unit 4521 and the second returning detection unit 4522 of the returning detection module 452 is used to detect the rotation status of the clutch gear 441. In this embodiment, the returning detection module 452 is a light detection module that can emit and receive light beams simultaneously. As mentioned above, the sensing points 4414 are light reflection points made of reflective material. While the clutch gear 441 is rotated, the sensing points 4414 are synchronously rotated. At the moment when any of the two sensing points 4414 is aligned with the first returning detection unit 4521 or the second returning detection unit 4522 of the returning detection module 452, the light beam from the returning detection module 452 is reflected by the sensing point 4414. Consequently, the intensity of the reflected light signal received by the first returning detection unit 4521 or the second returning detection unit 4522 is strengthened. Under this circumstance, the returning detection module 452 can sense that the sensing point 4414 is being transferred across it.

In this embodiment, the returning detection module 452 is a light detection module, and the sensing points 4414 are light reflection points. In practice, any other appropriate detection method may be used to replace the returning detection module 452 and the sensing points 4414. For example, in another embodiment, the returning detection module 452 is a Hall magnetic sensor module, and the sensing points 4414 are magnetic elements. By sensing the magnetic force of the sensing point 4414, the returning detection module 452 generates the corresponding control signal.

Figure 5:
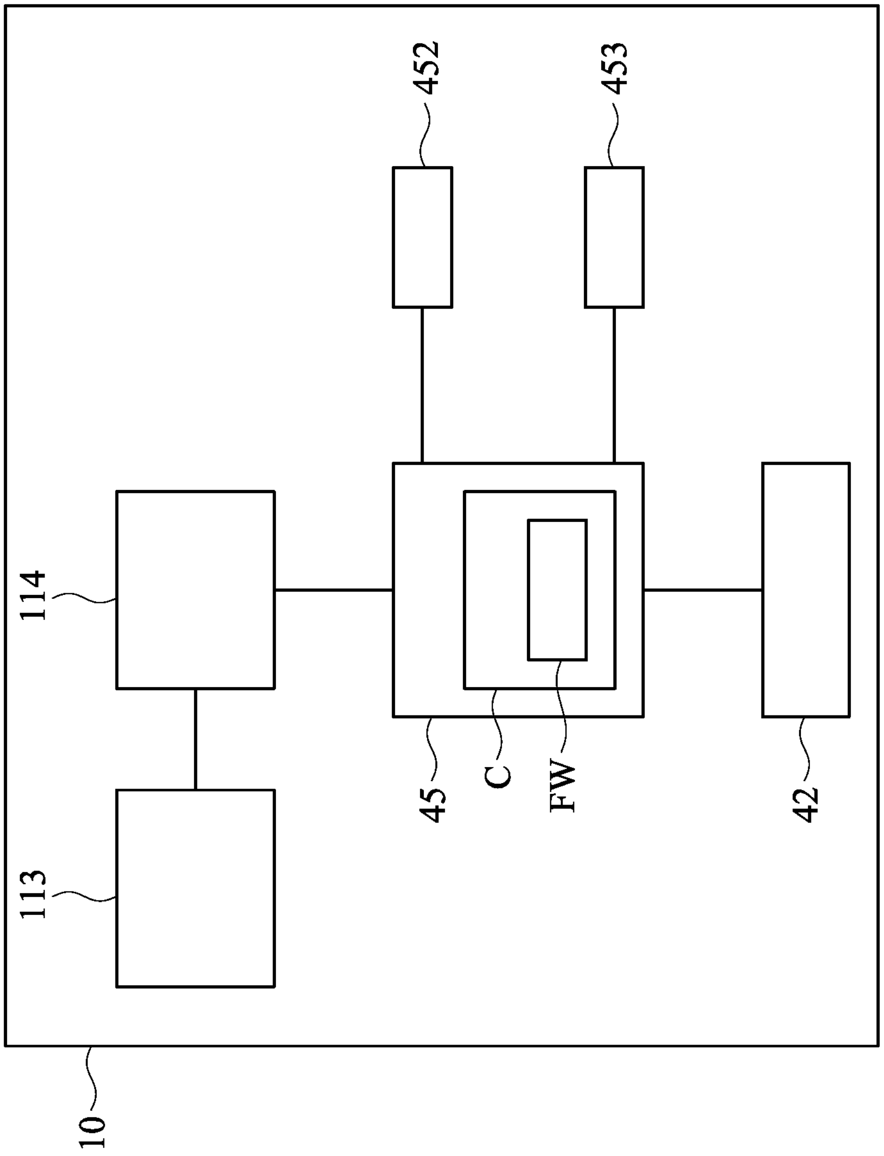
FIG. 5 is a schematic system block diagram illustrating the architecture of the first lock body of the electronic door lock according to the embodiment of the present invention.

Please refer to FIG. 5. FIG. 5 is a schematic system block diagram illustrating the architecture of the first lock body of the electronic door lock according to the embodiment of the present invention. The main circuit board 114 in the first lock body 10 is electrically connected with the power supply module 113 and the motion detection circuit board 45. The motion detection circuit board 45 is electrically connected with the returning detection module 452, the locking detection module 453 and the motor module 42. The motion detection circuit board 45 comprises a control circuit C. The control circuit C contains a firmware FW. The motion detection circuit board 45 can control the operating time and the rotating direction of the motor module 42 according to the feedback signals detected by the returning detection module 452 and the locking detection module 453 through the programming language of the firmware FW.

Figure 6A:
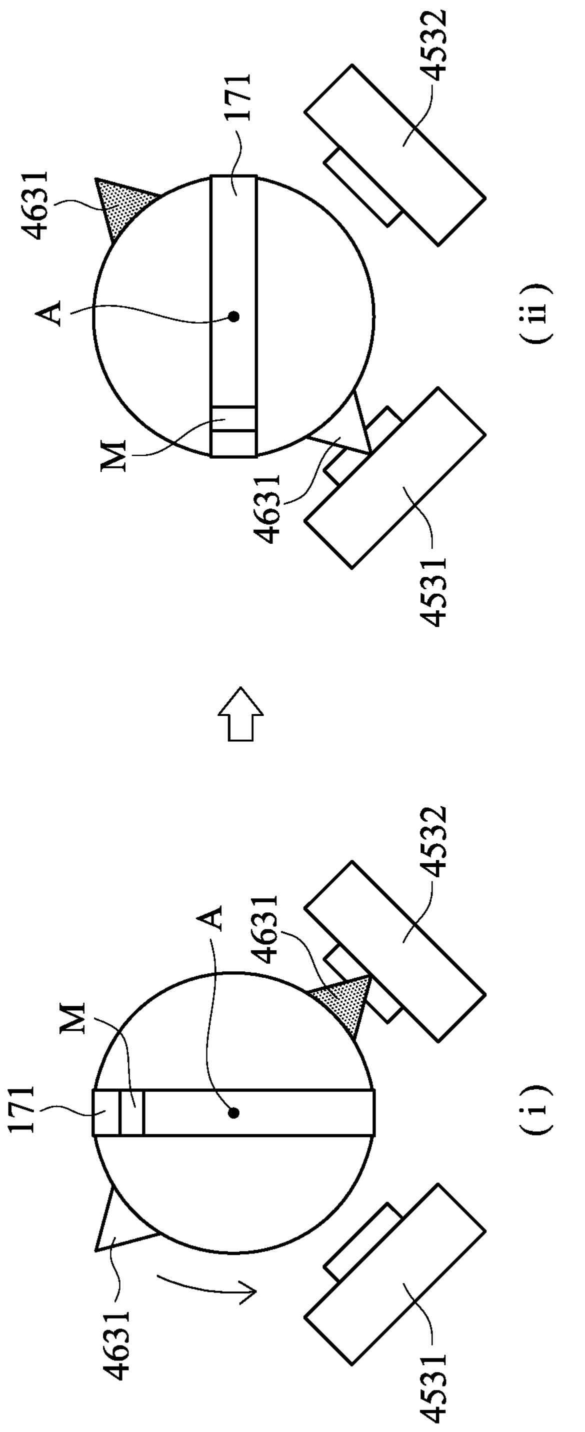
FIG. 6A schematically illustrates the operations of the locking detection module of the electronic door lock according to the embodiment of the present invention, in which the electronic door lock is locked in a first direction.
Figure 6B:
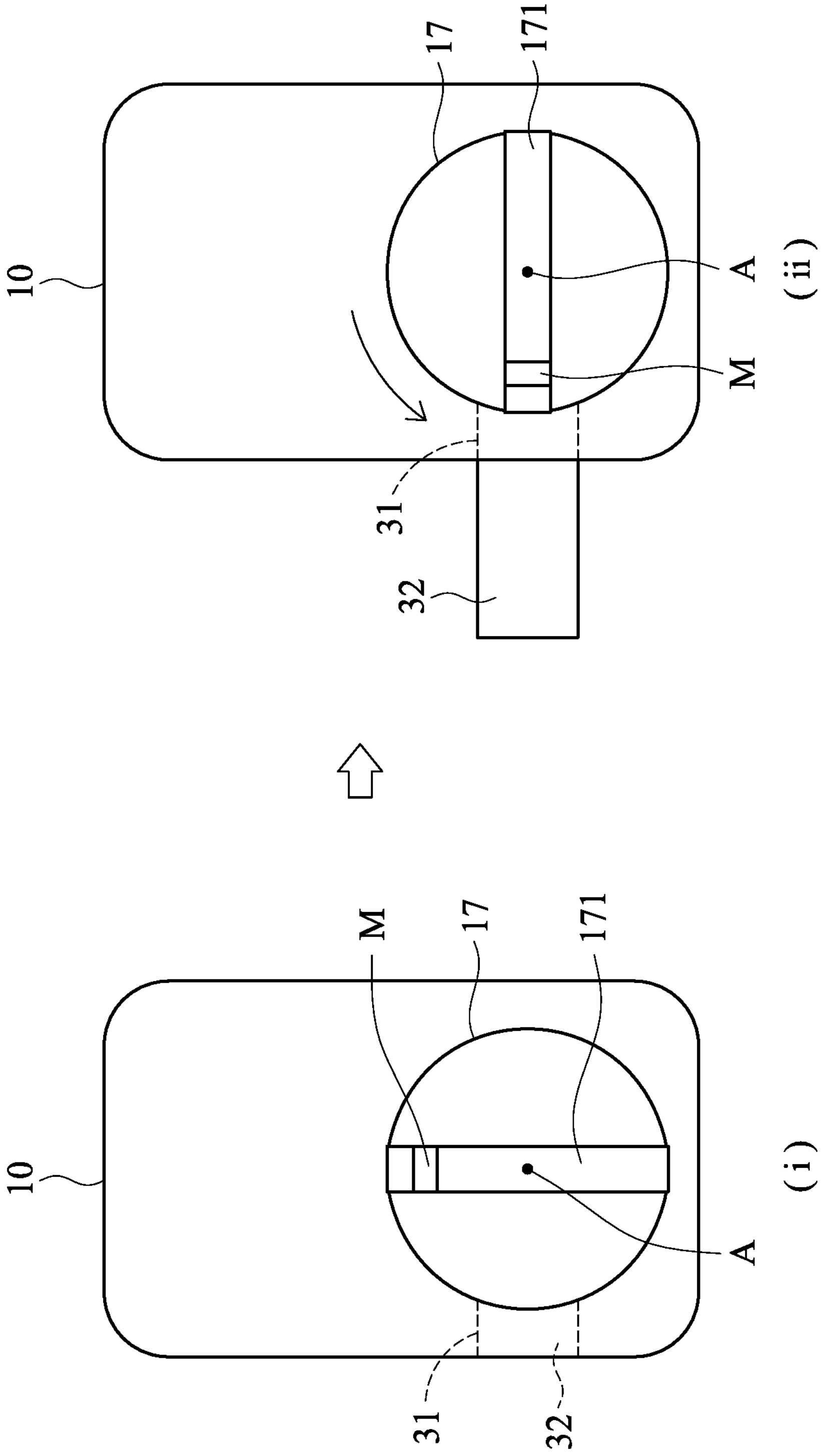
FIG. 6B schematically illustrates the operations of the latch bolt of the electronic door lock corresponding to the situation of FIG. 6A.
Figure 6C:
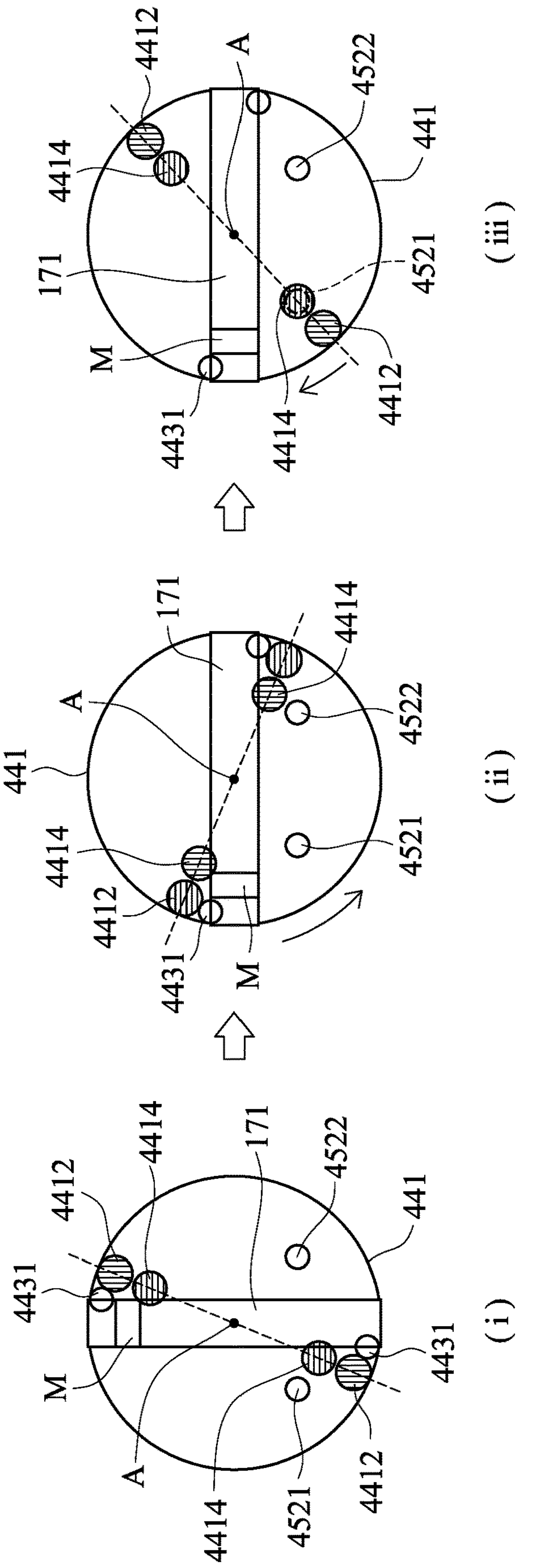
FIG. 6C schematically illustrates the operations of the clutch gear of the electronic door lock corresponding to the situation of FIG. 6A.

Please refer to FIGS. 4A, 4B, 4C, 6A, 6B and 6C. FIG. 6A schematically illustrates the operations of the locking detection module of the electronic door lock according to the embodiment of the present invention, in which the electronic door lock is locked in a first direction. FIG. 6B schematically illustrates the operations of the latch bolt of the electronic door lock corresponding to the situation of FIG. 6A. FIG. 6C schematically illustrates the operations of the clutch gear of the electronic door lock corresponding to the situation of FIG. 6A. For well understanding the concepts of the present invention, only some of the linked components along the rotation axis line A are shown in FIGS. 6A, 6B and 6C.

When the knob structure 171 of the operating element 17 is in a vertical status, the rotation mark M on the knob structure 171 is located at the 12 o'clock position (e.g., in the situation of FIG. 6A(i)). Meanwhile, the second locking detection unit 452 of the locking detection module 45 is pressed by the protruded edge 4631 at the right side of the transmission rod 46. Under this circumstance, the first locking detection unit 4531 and the second locking detection unit 4532 of the locking detection module 453 generate detection signals “0” and “1”, respectively. After the motion detection circuit board 45 receives the detection signals “0” and “1”, the motion detection circuit board 45 judges that the latch bolt 32 is completely received within the latch mandrel 31 (e.g., in the situation of FIG. 6B(i)).

Then, the knob structure 171 is manually rotated by the user, or the transmission rod 46 is driven by the motor module 42. Consequently, the knob structure 171 is rotated about the rotation axis line A in the counterclockwise direction, and the knob structure 171 is in a horizontal status. That is, as shown in FIG. 6A (ii), the rotation mark M on the knob structure 171 is rotated to the 9 o’clock position. Under this circumstance, the protruded edge 4631 originally contacted with the second locking detection unit 4532 is detached from the second locking detection unit 4532 and moved away from the second locking detection unit 4532. As the protruded edge 4631 at the left side of the transmission rod 46 is correspondingly rotated, the first locking detection unit 4531 of the locking detection module 453 is pressed by this protruded edge 4531. When the first locking detection unit 4531 of the locking detection module 453 is pressed, the first locking detection unit 4531 and the second locking detection unit 4532 of the locking detection module 453 generate detection signals “1” and “0”, respectively. After the motion detection circuit board 45 receives the detection signals “1” and “0”, the motion detection circuit board 45 judges that the latch bolt 32 has been protruded to the locking position in the first direction (e.g., in the situation of FIG. 6B(ii)). In this embodiment, the first direction is the left direction.

Please refer to FIG. 6C. While the electronic door lock 1 is automatically locked, the clutch gear 441 is driven by the motor module 42 through the transmission gear set 43 and rotated about the rotation axis line A in the counterclockwise direction. At the same time, the push blocks 4412 are rotated to push the stopping parts 4431 of the corresponding stopping elements 443 (e.g., in the situations of FIGS. 6C(i) and 6C(ii)). Consequently, the connection element 442 and the linked transmission rod 46 are correspondingly rotated. When the locking detection module 453 generates the detection signals “1” and “0” (e.g., in the situation of FIG. 6A(ii)) in response to the rotation of the transmission rod 46, it means that the latch bolt 32 has been protruded to the locking position (e.g., in the situation of FIG. 6B(ii)).

Then, the motion detection circuit board 45 controls the motor module 42 to drive the reverse rotation of the clutch gear 441. That is, the clutch gear 441 is rotated in the clockwise direction. As the clutch gear 441 is rotated, the push blocks 4412 are detached from the corresponding stopping parts 4431 and not interfered with the stopping parts 4431. Furthermore, after the returning detection module 452 detects that one sensing point 4414 is transferred across the second returning detection unit 4522 and the first returning detection unit 4521 sequentially, the clutch gear 441 is disabled. Meanwhile, as shown in FIG. 6C (iii), the returning process is completed.

Of course, the returning process may be varied according to the practical requirements. In another possible embodiment, after the returning detection module 452 detects that the sensing point 4414 is transferred across the second returning detection unit 4522 for the first time (i.e., in the situation of FIG. 6C (ii)), the second returning detection unit 4522 is disabled by the motion detection circuit board 45. Subsequently, after the returning detection module 452 detects that the sensing point 4414 is transferred across the first returning detection unit 4521, the clutch gear 441 is disabled. Meanwhile, as shown in FIG. 6C (iii), the returning process is completed.

After the returning process is completed, the push blocks 4412 of the clutch gear 441 are detached from the stopping parts 4431 of the corresponding stopping elements 443. Consequently, a buffering rotation space between each push block 4412 and the corresponding stopping part 4431 is created. While the knob structure 171 of the operating element 17 is manually rotated by the user, the transmission rod 46 is correspondingly rotated. After the rotation mark M on the knob structure 171 is returned to the 12 o’clock position (e.g., in the situation of FIG. 6C(i)), the stopping parts 4431 of the stopping elements 443 and the corresponding push blocks 4412 of the clutch gear 441 can be interfered with each other. By performing the returning process, the following benefit is achieved. For example, even if the clutch gear 441 is stuck, the user can effectively twist the operating element 17 to rotate the transmission rod 46.

Figure 7A:
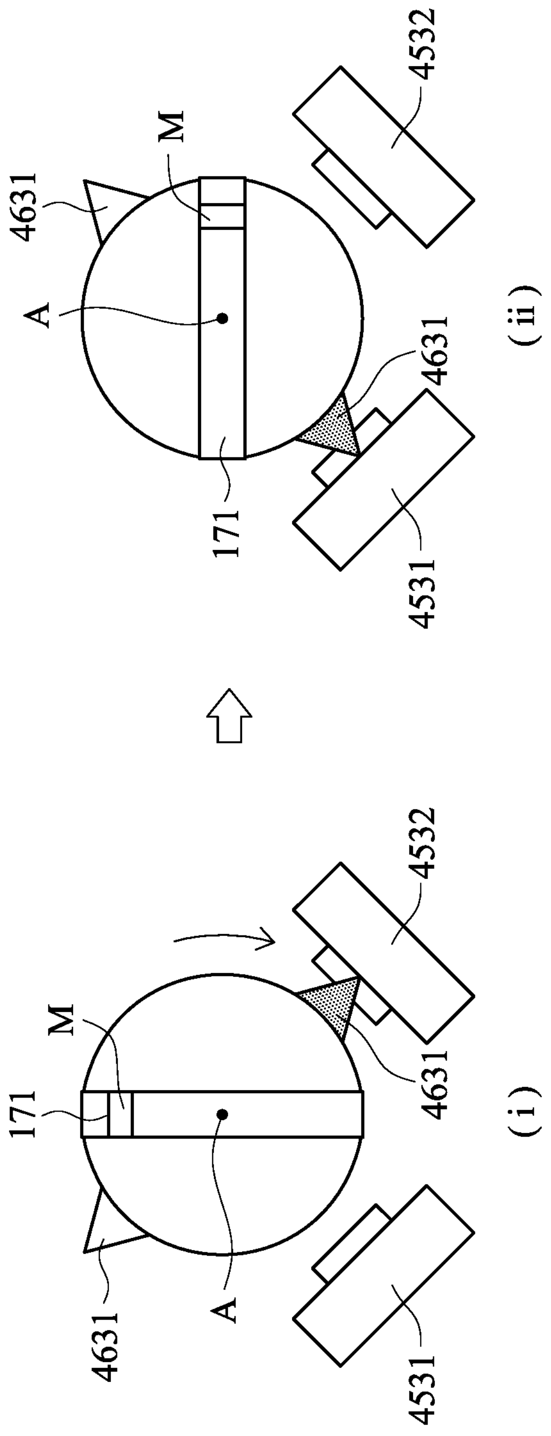
FIG. 7A schematically illustrates the operations of the locking detection module of the electronic door lock according to the embodiment of the present invention, in which the electronic door lock is locked in a second direction.
Figure 7B:
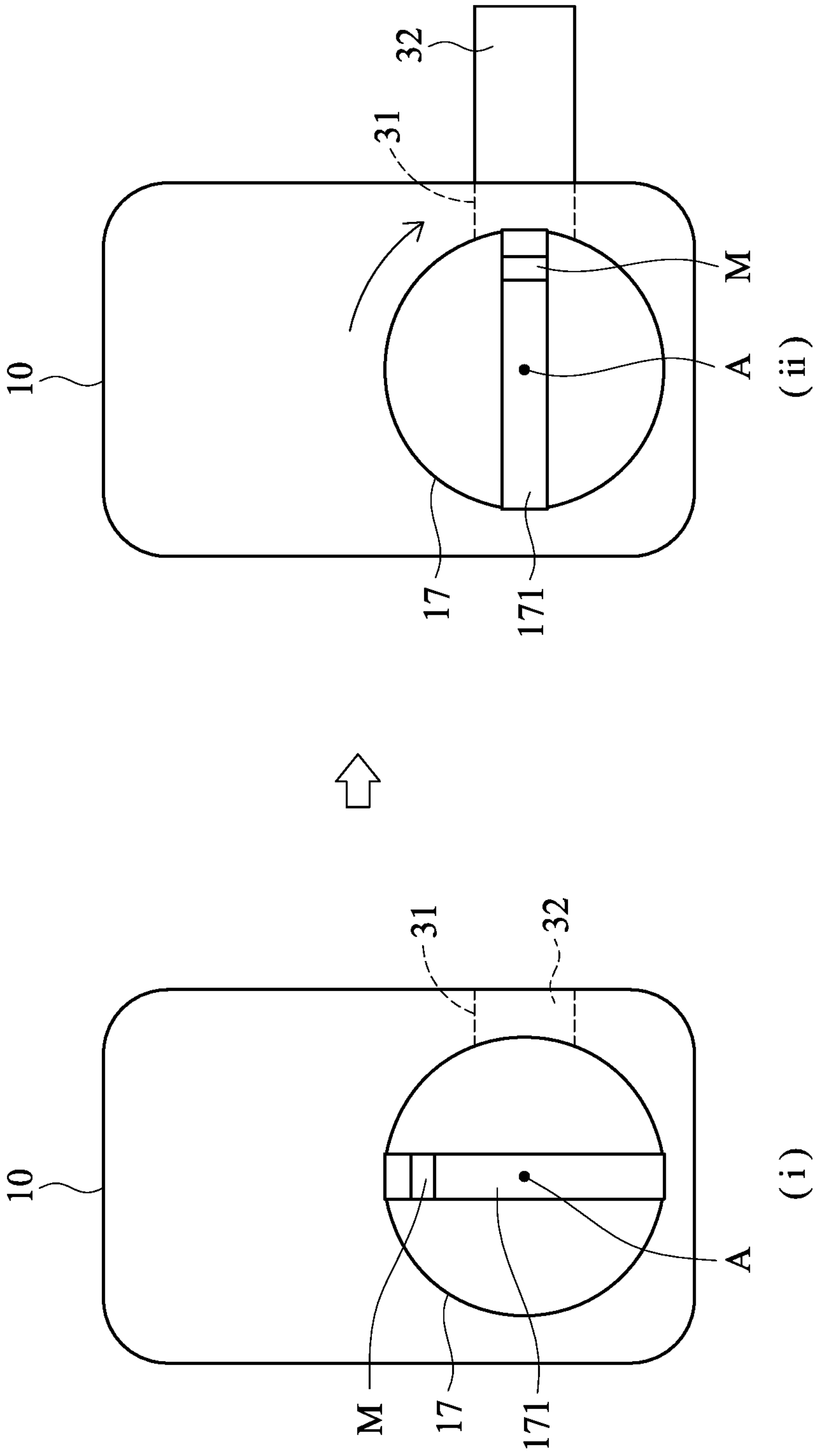
FIG. 7B schematically illustrates the operations of the latch bolt of the electronic door lock corresponding to the situation of FIG. 7A.
Figure 7C:
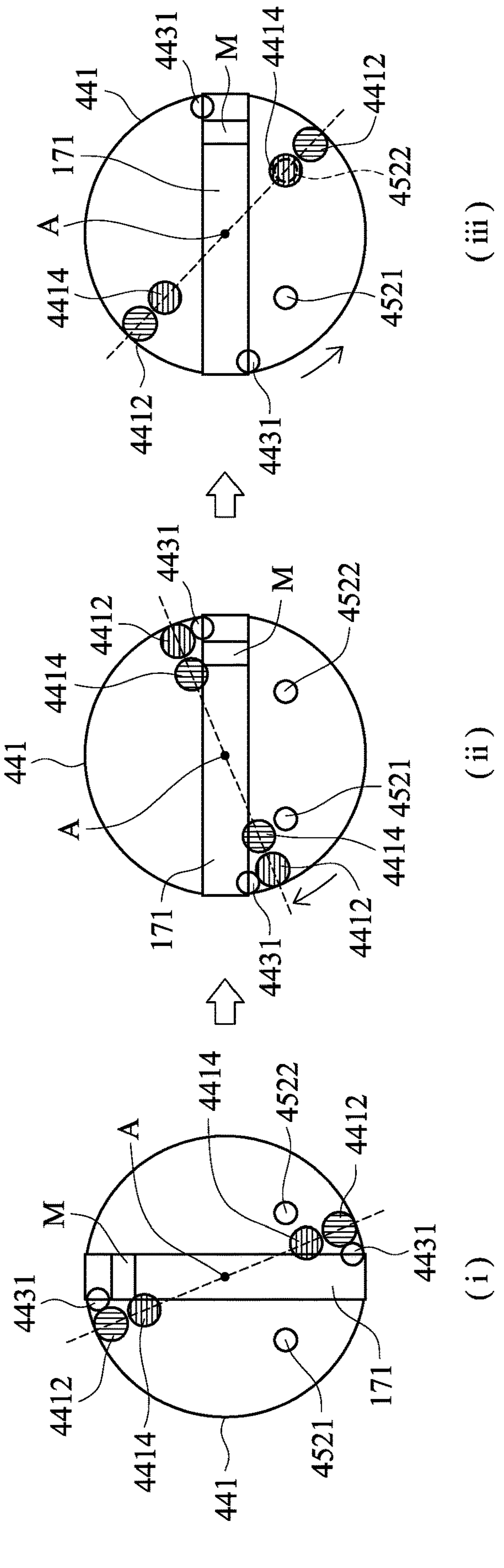
FIG. 7C schematically illustrates the operations of the clutch gear of the electronic door lock corresponding to the situation of FIG. 7A.

Please refer to FIGS. 4A, 4B, 4C, 7A, 7B and 7C. FIG. 7A schematically illustrates the operations of the locking detection module of the electronic door lock according to the embodiment of the present invention, in which the electronic door lock is locked in a second direction. FIG. 7B schematically illustrates the operations of the latch bolt of the electronic door lock corresponding to the situation of FIG. 7A. FIG. 7C schematically illustrates the operations of the clutch gear of the electronic door lock corresponding to the situation of FIG. 7A. For well understanding the concepts of the present invention, only some parts of the linked components are shown in FIGS. 7A, 7B and 7C.

In this embodiment, the latch bolt 32 is protruded out in a second direction. Consequently, the knob structure 171 and the clutch gear 441 are rotated about the rotation axis line A in the clockwise direction.

When the knob structure 171 of the operating element 17 is in a vertical status, the rotation mark M on the knob structure 171 is located at the 12 o’clock position (e.g., in the situation of FIG. 7A(i)). Meanwhile, the second locking detection unit 452 of the locking detection module 45 is pressed by the protrusion edge 4631 at the right side of the transmission rod 46. Under this circumstance, the first locking detection unit 4531 and the second locking detection unit 4532 of the locking detection module 453 generate detection signals “0” and “1”, respectively. After the motion detection circuit board 45 receives the detection signals “0” and “1”, the motion detection circuit board 45 judges that the latch bolt 32 is completely received within the latch mandrel 31 (e.g., in the situation of FIG. 7B(i)).

Then, the knob structure 171 is rotated about the rotation axis line A in the clockwise direction, and the knob structure 171 is in a horizontal status. That is, as shown in FIG. 7A (ii), the rotation mark M on the knob structure 171 is rotated to the 3 o’clock position. Under this circumstance, the protruded edge 4631 originally contacted with the second locking detection unit 4532 is detached from the second locking detection unit 4532 and moved away from the second locking detection unit 4532. The protruded edge 4631 at the right side of the transmission rod 46 is correspondingly rotated, and the first locking detection unit 4531 of the locking detection module 453 is pressed by the same protruded edge 4631. Under this circumstance, the first locking detection unit 4531 and the second locking detection unit 4532 of the locking detection module 343 detects detection signals “1” and “0”, respectively. After the motion detection circuit board 45 receives the detection signals “1” and “0”, the motion detection circuit board 45 judges that the latch bolt 32 has been protruded to the locking position in the second direction (e.g., in the situation of FIG. 7B(ii)). In this embodiment, the second direction is the right direction.

Please refer to FIG. 7C. While the electronic door lock 1 is automatically locked, the clutch gear 441 is driven by the motor module 42 through the transmission gear set 43 and rotated about the rotation axis line A in the clockwise direction. At the same time, the push blocks 4412 are rotated to push the stopping parts 4431 of the corresponding stopping elements 443 (e.g., in the situations of FIGS. 7C(i) and 7C(ii)). Consequently, the connection element 442 and the linked transmission rod 46 are correspondingly rotated. When the locking detection module 453 generates the detection signals "1" and "0" (e.g., in the situation of FIG. 7A(ii)) in response to the rotation of the transmission rod 46, it means that the latch bolt 32 has been protruded to the locking position (e.g., in the situation of FIG. 7B(ii)).

Then, the motion detection circuit board 45 controls the motor module 42 to drive the reverse rotation of the clutch gear 441. That is, the clutch gear 441 is rotated in the counterclockwise direction. As the clutch gear 441 is rotated, the push blocks 4412 are detached from the stopping parts 4431 and not interfered with the stopping parts 4431. Furthermore, after the returning detection module 452 detects that one sensing point 4414 is transferred across the first returning detection unit 4521 and the second returning detection unit 4522 sequentially, the clutch gear 441 is disabled. Meanwhile, as shown in FIG. 7C (iii), the returning process is completed.

Of course, the returning process may be varied according to the practical requirements. In another possible embodiment, after the returning detection module 452 detects that the sensing point 4414 is transferred across the first returning detection unit 4521 for the first time (i.e., in the situation of FIG. 7C (ii)), the first returning detection unit 4521 is disabled by the motion detection circuit board 45. Subsequently, after the returning detection module 452 detects that the sensing point 4414 is transferred across the second returning detection unit 4522, the clutch gear 441 is disabled. Meanwhile, as shown in FIG. 7C (iii), the returning process is completed.

Figure 8:
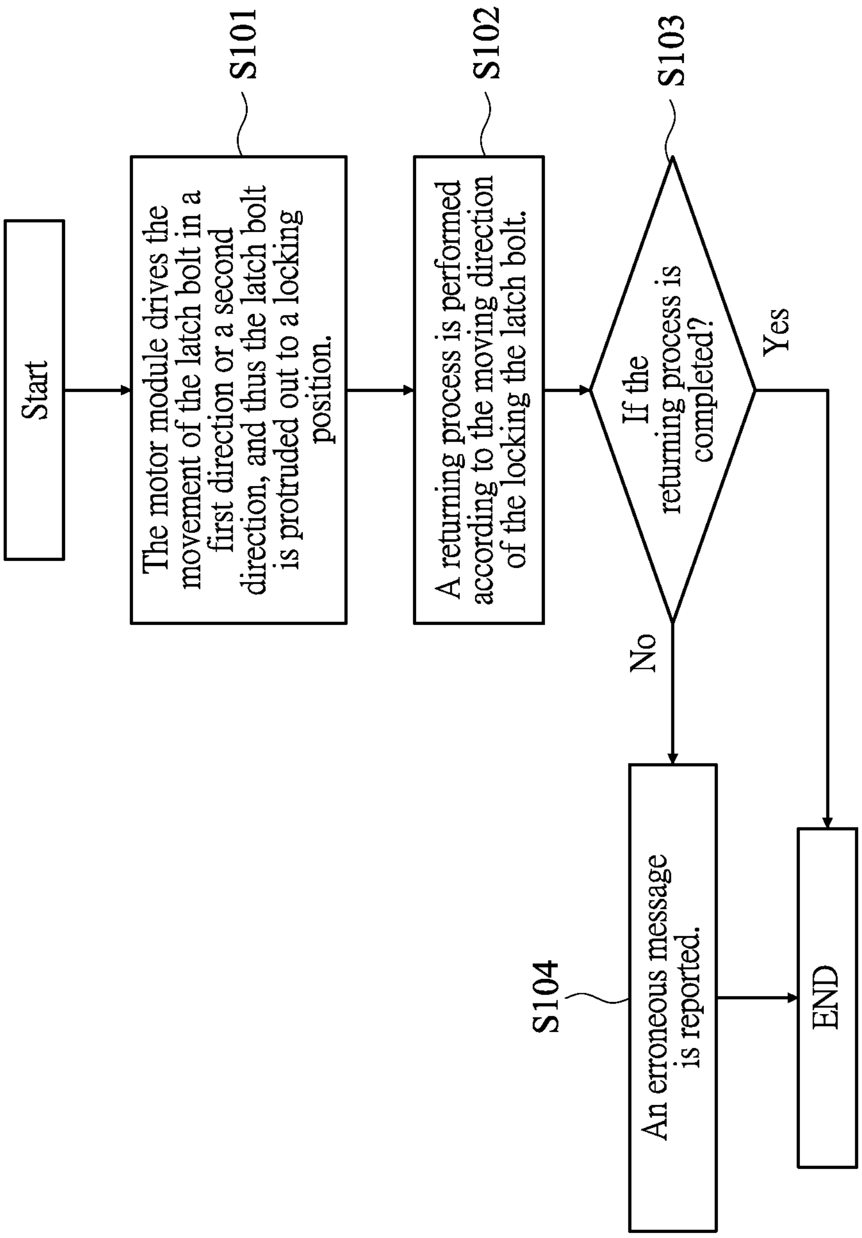
FIG. 8 is a flowchart illustrating a returning control method for the electronic door lock according to an embodiment of the present invention.

Please refer to FIGS. 6A, 6B, 6C, 7A, 7B, 7C and 8. FIG. 8 is a flowchart illustrating a returning control method for the electronic door lock according to an embodiment of the present invention. The returning control method is applied to the electronic door lock 1 when the electronic door lock 1 is installed on a door panel.

When the electronic door lock 1 is operated in an electrically controlled manner, the flowchart of the returning control method is started.

Firstly, the motor module 42 drives the movement of the latch bolt 32 in a first direction or a second direction, and thus the latch bolt 32 is protruded out to a locking position (Step S101). In the step S101, the motion detection circuit board 45 controls the motor module 42 to drive the movement of the latch bolt 32 in the first direction or the second direction. If the locking detection module 453 of the motion detection circuit board 45 still generates the detection signals "0" and "1" after a predetermined time limit, it means that the latch bolt 32 has not been protruded to the locking position. Whereas, if the locking detection module 453 of the motion detection circuit board 45 generates the detection signals "1" and "0" (e.g., in the situation of FIG. 6A(ii) or FIG. 7A(ii)), it means that the latch bolt 32 has been protruded to the locking position (e.g., in the situation of FIG. 6B(ii) or FIG. 7B(ii)). In an embodiment, the first direction is a left direction, and the second direction is a right direction.

Then, a returning process is performed according to the moving direction of the locking the latch bolt 32 (Step S102). If the latch bolt 32 is moved to the locking position in the first direction (e.g., the left direction in the situation of FIG. 6B) in the step S101, the returning process is performed according to the first direction in the step S102. That is, when the returning process is performed, the clutch gear 441 is rotated about the rotation axis line A in the clockwise direction (e.g., in the situation of FIG. 6C). On the other hand, if the latch bolt 32 is moved to the locking position in the second direction (e.g., the right direction in the situation of FIG. 7B) in the step S101, the returning process is performed according to the second direction in the step S102. That is, when the returning process is performed, the clutch gear 441 is rotated about the rotation axis line A in the counterclockwise direction (e.g., in the situation of FIG. 7C).

After the returning process is completed, the push blocks 4412 of the clutch gear 441 are detached from the stopping parts 4431 of the corresponding stopping elements 443. Consequently, a buffering rotation space between each push block 4412 and the corresponding stopping part 4431 is created. Consequently, even if the clutch gear 441 is stuck, the user can effectively twist the operating element 17 to rotate the transmission rod 46.

Then, a step S103 is performed to judge whether the returning process is completed.

In the step S103, the following scenarios indicate that the returning process is not completed according to the detection results of the returning detection module 452 of the motion detection circuit board 45 (e.g., in the situations of FIGS. 6C and 7C). For example, if no sensing point is transferred through the second returning detection unit 4522 and the first returning detection unit 4521 sequentially, it means that the returning process is not completed. Similarly, if no sensing point is transferred through the first returning detection unit 4521 and the second returning detection unit 4522 sequentially, it means that the returning process is not completed. Similarly, if no sensing point is transferred through the enabled first returning detection unit 4521 or the enabled second returning detection unit 4522, it means that the returning process is not completed. If the judging condition of the step S103 is not completed, an erroneous message is reported (Step S104).

In the step S104, the motion detection circuit board 45 issues the erroneous message and transmits the erroneous message to the main circuit board 114 (see FIG. 5) of the electronic door lock 1. In response to the erroneous message, the main circuit board 114 generates an error warning signal through an operation interface, a display interface or a speaker (not shown). The error warning signal can prompt the user that the electronic door lock 1 is unable to work normally because of installation errors or abnormal internal components.

In the step S103, if a sensing point is transferred through the second returning detection unit 4522 and the first returning detection unit 4521 sequentially, or a sensing point is transferred through the first returning detection unit 4521 and the second returning detection unit 4522 sequentially or a sensing point is transferred through the enabled first returning detection unit 4521 or the enabled second returning detection unit 4522, it means that the returning process is completed. Then, under control of the motion detection circuit board 45, the motor module 12 stops driving the clutch gear 441. Meanwhile, the returning process is completed.

From the above descriptions, the present invention provides an electronic door lock and a transmission mechanism of the electronic door lock. When compared with the conventional technologies, the transmission mechanism of the present invention can drive the movement of the latch bolt of the electronic door lock in two different directions. Consequently, the electronic door lock is suitably applied to the door panel opened/closed to the left side or the door panel opened/closed to the right side. Moreover, after the latch bolt is protruded to the locking position, the returning process is performed. Consequently, even if the clutch gear is stuck, the user can easily twist the operating element to unlock the electronic door lock.

Furthermore, the sensing elements for sensing the actuation states of the transmission components (e.g., the returning detection module and the locking detection module) and the corresponding sensing structures are integrated into the transmission mechanism. Due to this structural design, the long-term accumulated actuation tolerance of the transmission components in the electronic door lock can be effectively reduced. In other words, the sensing elements can correctly sense the actuation state of the transmission components, and the transmission components in the electronic door lock can be operated normally. Moreover, due to the integrated design of the transmission mechanism, the overall volume of the transmission mechanism will be reduced, and the transmission mechanism can be installed in different electronic door locks in a simplified manner. Consequently, the cost of designing and fabricating the electronic door lock is reduced. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An electronic door lock installed on a door panel, the electronic door lock comprising:

a first lock body comprises a pedestal member and a covering member;

a transmission mechanism installed on the first lock body, and comprising:

a gear box comprising a lower cover and an upper cover, which are combined with each other, wherein the lower cover comprises a first opening and at least one or more detection holes, and the upper cover comprises a second opening corresponding to the first opening;

a motor module installed on the lower cover;

a transmission gear set pivotally coupled with the lower cover and engaged with the motor module;

a transmission rod, wherein a first end and a second end of the transmission rod are respectively penetrated through the first opening and the second opening;

a clutch transmission module comprising a clutch gear, a connection element and two stopping elements, wherein the clutch gear has a first surface and a second surface opposite to the first surface, wherein a concave structure is formed in the first surface, two push blocks are disposed within the concave structure, arranged along a same rotation path and opposed to each other, a first pivotal hole runs through a middle region of the concave structure, and two sensing points are formed on the second surface, arranged along a same rotation path and opposed to each other, wherein the transmission rod is penetrated through the first axial hole, so that the clutch gear is pivotally coupled with the transmission rod and engaged with the transmission gear set, wherein the connection element is rotatably embedded within the concave structure, and the connection element and the transmission rod are connected with each other, so that the connection element is linked with the transmission rod, wherein the two stopping elements are installed on two opposite sides of the connection element, and the two stopping elements comprise two stopping parts corresponding to the two push blocks, respectively; and a motion detection circuit board electrically connected with the motor module and installed on a lateral side of the lower cover away from the upper cover, wherein the motion detection circuit board has a third surface and a fourth surface opposite to the third surface, wherein a returning detection module is installed on the third surface, the returning detection module is installed in the at least one or more detection holes, the returning detection module comprises a first returning detection unit and a second returning detection unit, and the first returning detection unit and the second returning detection unit are aligned with a rotation path of the two sensing points; and a latch assembly comprising a latch mandrel, a latch bolt and a torque blade, wherein the latch bolt is received within the latch mandrel, the torque blade is penetrated through the latch mandrel, the torque blade is connected with the first end of the transmission rod, and the latch bolt is selectively protruded out or retracted back through the torque blade, wherein while the motor module drives a rotation of the clutch gear through the transmission gear set, the two push blocks are rotated to push the stopping parts of the corresponding stopping elements, and the transmission rod is correspondingly rotated, wherein while the transmission rod is rotated, the torque blade is correspondingly rotated, and the latch bolt is correspondingly protruded out of the latch mandrel, wherein after the latch bolt is protruded to a locking position, the motor module drives a reverse rotation of the clutch gear, and the two push blocks are detached from the corresponding stopping elements, wherein when the motion detection circuit board detects that one of the two sensing points is transferred across at least one of the first returning detection unit and the second returning detection unit, the reverse rotation of the clutch gear is stopped, and a returning process is completed.

2. The electronic door lock according to claim 1, wherein the first end of the transmission rod comprises a transmission body, and two protruded edges are formed on two opposite sides of the transmission body along a radial direction of the transmission rod.

3. The electronic door lock according to claim 2, wherein the electronic door lock further comprises a locking detection module, wherein the locking detection module is installed on the fourth surface of the motion detection circuit board, and the locking detection module comprises a first locking detection unit and a second locking detection unit corresponding to the two protruded edges.

4. The electronic door lock according to claim 3, wherein when the latch bolt is completely received within the latch mandrel, the second locking detection unit is pressed by a first protruded edge of the two protruded edges.

5. The electronic door lock according to claim 4, wherein while the latch bolt is protruded to the locking position, the first protruded edge is detached from the second locking detection unit, and a second protruded edge of the two protruded edges is correspondingly moved and then contacted with the first locking detection unit.

6. The electronic door lock according to claim 4, wherein while the latch bolt is protruded to the locking position, the first protruded edge is detached from the second locking detection unit and then contacted with the first locking detection unit.

7. The electronic door lock according to claim 3, wherein the locking detection module is a micro switch module.

8. The electronic door lock according to claim 1, wherein the returning detection module is a light detection module, and the two sensing points are light reflection points.

9. The electronic door lock according to claim 1, wherein the returning detection module is a Hall magnetic sensor module, and the two sensing points are magnetic elements.

10. The electronic door lock according to claim 1, wherein a polygonal coupling recess is formed in a surface of the connection element facing the clutch gear.

11. The electronic door lock according to claim 10, wherein the transmission rod further comprises a polygonal coupling block corresponding to the polygonal coupling recess, and the polygonal coupling block is protruded along a radial direction of the transmission rod, wherein the polygonal coupling block and the polygonal coupling recess are coupled with each other, so that the connection element is linked with the transmission rod.

12. The electronic door lock according to claim 10, wherein the connection element comprises a second axial hole, and the second axial hole is coaxial with the polygonal coupling recess.

13. The electronic door lock according to claim 12, wherein the electronic door lock further comprises an operation element, and the covering member comprises a mounting hole, wherein the operation element is installed in the mounting hole.

14. The electronic door lock according to claim 13, wherein the second end of the transmission rod is connected with the operation element through the mounting hole.

15. The electronic door lock according to claim 14, wherein the second end of the transmission rod comprises a fixing segment, and the operation element comprises a knob structure and a shaft part, wherein the shaft part is connected with the knob structure, the shaft part is installed in the mounting hole, and the shaft part is connected with the fixing segment.

16. The electronic door lock according to claim 1, wherein the motor module comprises a motor body and a worm screw, wherein the worm screw is connected with the motor body.

17. The electronic door lock according to claim 16, wherein the transmission gear set comprises a first composite gear and a second composite gear, wherein the first composite gear comprises a first large-diameter tooth part and a first small-diameter tooth part, and the first large-diameter tooth part and the first small-diameter tooth part are coaxial with each other, wherein the second composite gear comprises a second large-diameter tooth part and a second small-diameter tooth part, and the second large-diameter tooth part and the second small-diameter tooth part are coaxial with each other.

18. The electronic door lock according to claim 17, wherein the first small-diameter tooth part of the first composite gear and the clutch gear are engaged with each other, the first large-diameter tooth part of the first composite gear and the second small-diameter tooth part of the second composite gear are engaged with each other, and the second large-diameter tooth part of the second composite gear and the worm screw of the motor module are engaged with each other.

19. The electronic door lock according to claim 1, wherein the each of the two stopping elements is made of a material with rigidity and elasticity.

20. A transmission mechanism for an electronic door lock, the transmission mechanism comprising:

a gear box comprising a lower cover and an upper cover, which are combined with each other, wherein the lower cover comprises a first opening and at least one or more detection holes, and the upper cover comprises a second opening corresponding to the first opening;

a motor module installed on the lower cover;

a transmission gear set pivotally coupled with the lower cover and engaged with the motor module;

a transmission rod, wherein a first end and a second end of the transmission rod are respectively penetrated through the first opening and the second opening;

a clutch transmission module comprising a clutch gear, a connection element and two stopping elements, wherein the clutch gear has a first surface and a second surface opposite to the first surface, wherein a concave structure is formed in the first surface, two push blocks are disposed within the concave structure, arranged along a same rotation path and opposed to each other, a first pivotal hole runs through a middle region of the concave structure, and two sensing points are formed on the second surface, arranged along a same rotation path and opposed to each other, wherein the transmission rod is penetrated through the first axial hole, so that the clutch gear is pivotally coupled with the transmission rod and engaged with the transmission gear set, wherein the connection element is rotatably embedded within the concave structure, and the connection element and the transmission rod are connected with each other, so that the connection element is linked with the transmission rod, wherein the two stopping elements are installed on two opposite sides of the connection element, and the two stopping elements comprise two stopping parts corresponding to the two push blocks, respectively; and a motion detection circuit board electrically connected with the motor module and installed on a lateral side of the lower cover away from the upper cover, wherein the motion detection circuit board has a third surface and a fourth surface opposite to the third surface, wherein a returning detection module is installed on the third surface, the returning detection module is installed in the at least one or more detection holes, the returning detection module comprises a first returning detection unit and a second returning detection unit, and the first returning detection unit and the second returning detection unit are aligned with a rotation path of the two sensing points.

21. The transmission mechanism according to claim 20, wherein the first end of the transmission rod comprises a transmission body, and two protruded edges are formed on two opposite sides of the transmission body along a radial direction of the transmission rod.

22. The transmission mechanism according to claim 21, wherein the transmission mechanism further comprises a locking detection module, wherein the locking detection module is installed on the fourth surface of the motion detection circuit board, and the locking detection module comprises a first locking detection unit and a second locking detection unit, wherein the first locking detection unit and the second locking detection unit correspond to the two protruded edges, and the first locking detection unit or the second locking detection unit is permitted to be pressed by one of the two protruded edges.

23. The transmission mechanism according to claim 22, wherein the locking detection module is a micro switch module.

24. The transmission mechanism according to claim 20, wherein the returning detection module is a light detection module, and the two sensing points are light reflection points.

25. The transmission mechanism according to claim 20, wherein the returning detection module is a Hall magnetic sensor module, and the two sensing points are magnetic elements.

26. The transmission mechanism according to claim 20, wherein a polygonal coupling recess is formed in a surface of the connection element facing the clutch gear.

27. The transmission mechanism according to claim 26, wherein the transmission rod further comprises a polygonal coupling block corresponding to the polygonal coupling recess, and the polygonal coupling block is protruded along a radial direction of the transmission rod, wherein the polygonal coupling block and the polygonal coupling recess are coupled with each other, so that the connection element is linked with the transmission rod.

28. The transmission mechanism according to claim 26, wherein the connection element comprises a second axial hole, and the second axial hole is coaxial with the polygonal coupling recess.

29. The transmission mechanism according to claim 20, wherein the motor module comprises a motor body and a worm screw, wherein the worm screw is connected with the motor body.

30. The transmission mechanism according to claim 29, wherein the transmission gear set comprises a first composite gear and a second composite gear, wherein the first composite gear comprises a first large-diameter tooth part and a first small-diameter tooth part, and the first large-diameter tooth part and the first small-diameter tooth part are coaxial with each other, wherein the second composite gear comprises a second large-diameter tooth part and a second small-diameter tooth part, and the second large-diameter tooth part and the second small-diameter tooth part are coaxial with each other.

31. The transmission mechanism according to claim 30, wherein the first small-diameter tooth part of the first composite gear and the clutch gear are engaged with each other, the first large-diameter tooth part of the first composite gear and the second small-diameter tooth part of the second composite gear are engaged with each other, and the second large-diameter tooth part of the second composite gear and the worm screw of the motor module are engaged with each other.

32. The transmission mechanism according to claim 20, wherein the each of the two stopping elements is made of a material with rigidity and elasticity.

* * * * *